(12) United States Patent
Endo et al.

(10) Patent No.: US 8,149,689 B2
(45) Date of Patent: Apr. 3, 2012

(54) COMMUNICATION SYSTEM HAVING ROUTE REDUNDANCY

(75) Inventors: Hideki Endo, Kokubunji (JP); Masayuki Takase, Fujisawa (JP); Takayuki Kanno, Yokohama (JP); Akihiko Tanaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 12/389,661

(22) Filed: Feb. 20, 2009

(65) Prior Publication Data

US 2009/0232148 A1   Sep. 17, 2009

(30) Foreign Application Priority Data

Mar. 13, 2008  (JP) ................. 2008-063521

(51) Int. Cl.
*G01R 31/08* (2006.01)
*G01F 11/20* (2006.01)

(52) U.S. Cl. ....................... 370/217; 370/401

(58) Field of Classification Search ............... 370/216, 370/352, 217–220, 401
See application file for complete search history.

(56) References Cited

U.S. PATENT DOCUMENTS

| | | | |
|---|---|---|---|
| 6,229,787 B1 | 5/2001 | Byrne | |
| 6,856,598 B1* | 2/2005 | Stanfield | 370/235 |
| 6,882,626 B1 | 4/2005 | Marathe et al. | |
| 2003/0058790 A1* | 3/2003 | Nagamine | 370/222 |
| 2003/0169691 A1 | 9/2003 | Powers et al. | |
| 2003/0189898 A1 | 10/2003 | Frick et al. | |
| 2006/0165087 A1* | 7/2006 | Page et al. | 370/395.3 |
| 2006/0215654 A1 | 9/2006 | Sivakumar et al. | |
| 2007/0133398 A1* | 6/2007 | Zhai | 370/228 |
| 2007/0214275 A1* | 9/2007 | Mirtorabi et al. | 709/230 |
| 2007/0253327 A1 | 11/2007 | Saha et al. | |

FOREIGN PATENT DOCUMENTS

| | | |
|---|---|---|
| CN | 101103595 A | 1/2008 |
| EP | 0 777 401 A1 | 6/1997 |
| EP | 1 432 204 A2 | 6/2004 |
| WO | 2006/061547 A1 | 6/2006 |

OTHER PUBLICATIONS

ITU-T Recommendation: Y.1731 (OAM functions and mechanisms for Ethernet bses networks) May 2006.
IEEEP802.1ag/D8.1—Jun. 2007.
ITU-T Recommendation: G.8031/Y.1342 (Ethernet Protection Switching) Jun. 2006.
M. Lasserre et al., Virtual Private LAN Services over MPLS, L2VPN Working Group, draft-ietf-l2vpn-vpls-ldp-08.txt, IETF Standard-Working-Draft, Internet Engineering Task Force, IETF, CH, vol. 12vpn, No. 8, Nov. 1, 2005.

* cited by examiner

*Primary Examiner* — Hassan Phillips
*Assistant Examiner* — Saba Tsegaye
(74) *Attorney, Agent, or Firm* — Mattingly & Malur, PC

(57) ABSTRACT

A packet communication system of this invention includes a user access device at a user point for providing a user with connectivity to a plurality of carriers, carrier communication networks linked to the user access device, and a carrier management network which controls and manages the user access device and communication devices. A communication device receives a control frame-inserting command from the carrier management network, and sends a control frame containing therein control frame transfer information that indicates which one of termination and send-back processing is performed at a destination device. In response to receipt of the control frame, a user access device that is the destination of this frame extracts therefrom the control frame transfer information. If this information indicates the termination then perform termination; if send-back, add thereto a header necessary for the send-back and then transfer it.

4 Claims, 19 Drawing Sheets

FIG.7

HEADER PROCESSING TABLE
23

| VLAN ID | TAG PROCESSING | PROCESSING VLAN TAG | FLOW ID |
|---------|----------------|---------------------|---------|
| VID#1   | CONVERT        | VID#10,CoS7         | FLOW ID #1 |
| VID#2   | ADD            | VID#20,CoS3         | FLOW ID #2 |
| ⋮       | ⋮              | ⋮                   | ⋮        |

FRAME SEND TABLE
22

| VLAN ID | INPUT NIF ID | INPUT PORT ID | OUTPUT NIF ID | OUTPUT PORT ID |
|---------|--------------|---------------|---------------|----------------|
| VID#1   | NIF#0        | PORT #0       | NIF#5         | PORT #0        |
| VID#2   | NIF#1        | PORT #0       | NIF#1         | PORT #1        |
| ⋮       | ⋮            | ⋮             | ⋮             | ⋮              |

OAM/APS TABLE 24

| FLOW ID | OAM INFO | | APS INFO | | | VLAN ID | SOURCE MAC ADDRESS | DESTINATION MAC ADDRESS |
|---|---|---|---|---|---|---|---|---|
| | LOC STATE | ........ | PAIR NIF ID | PAIR PORT ID | ........ | | | |
| FLOW ID #1 | 0 | | NIF#0 | PORT #0 | | VID#1 | MAC#10N05 | MAC#10A |
| | 1 | | NIF#0 | PORT #1 | | VID#10 | MAC#10N01 | MAC#10C |
| FLOW ID #2 | 0 | | NIF#0 | PORT #3 | | VID#2 | MAC#10N09 | MAC#701 |
| | 0 | | ANOTHER NIF | – | | VID#20 | MAC#10N03 | MAC#70N |
| ........ | | | | | | ........ | ........ | ........ |

NODE MANAGE TABLE 21

| FLOW ID | APS INFO 212 | | | | VLAN ID | SOURCE MAC ADDR | DESTINATION MAC ADDR | |
|---|---|---|---|---|---|---|---|---|
| | PAIR NIF# | PAIR PORT ID | CTRL ROUTE | ...... | | | | |
| FLOW ID #1 | NIF#0 | PORT #0 | NORMAL | | VID#1 | MAC#10N05 | MAC#10A | |
| | NIF#0 | PORT #1 | ABNORMAL | | VID#10 | MAC#10N01 | MAC#10C | |
| FLOW ID #2 | NIF#0 | PORT #3 | NORMAL | | VID#2 | MAC#10N09 | MAC#70I | |
| | NIF#3 | PORT #0 | ABNORMAL | | VID#20 | MAC#10N03 | MAC#70N | |
| ...... | ...... | ...... | ...... | | ...... | ...... | ...... | |
| 211 | 2121 | 2122 | 2123 | | 213 | 214 | 215 | |

US 8,149,689 B2

COMMUNICATION SYSTEM HAVING ROUTE REDUNDANCY

INCORPORATION BY REFERENCE

The present application claims priority from Japanese application JP2008-063521 filed on Mar. 13, 2008, the content of which is hereby incorporated by reference into this application.

BACKGROUND OF THE INVENTION

The present invention relates generally to packet communications systems and, more particularly, to a packet data communication system capable of providing control path/route redundancy capabilities in the process of performing remote control of access devices which are installed at user points.

In 1906, the leased-line telecommunication technology was first introduced in Japan in the form of a hotline which enables financial institutions to impart market conditions to each other on a real-time basis. Even today, after the elapse of more than one hundred years, the lease line is still expected to act as important infrastructure supporting mission-critical business services in national defense operations and financial and broadcasting activities, which are under requirements for higher security and reliability. Prior known lease line designs for physical one-to-one connection between users or subscribers are less in malfunction owing to simplicity of configuration. This ensures achievability of high security. In addition, it is easy to establish redundant paths for communications; so, it is possible to provide services of very high reliability. However, a user's exclusive possession of one line results in an increase in communication expense. This limits the usability so that a lease line is used only for supremely important communications of a special cooperate entity.

Meanwhile, packet exchange/switching networks using Ethernet™ lines have been explosively popularized, and components for use therein are becoming lower in cost and price owing to mass-production effects. In such packet switching networks, the use of virtual private network (VPN) technologies, such as virtual local area network (VLAN), multi-protocol label switching (MPLS) or like techniques, makes it possible to accommodate users in a logically completely separated network, thereby enabling securement of the security required. Furthermore, the standardization of new telecommunications architectures, including the operation administration and maintenance (OAM) for operation failure detection and the automatic protection switching (APS) for switching between communication paths, is being advanced—or has already been completed—in some entities, such as the International Telecommunication Union-Telecommunication Sector (ITU-T), the Institute of Electrical and Electronics Engineers (IEEE) or else. This contributes to appreciable improvements in fault tolerance. Accordingly, in recent years, lease line services using packet exchange networks become commercially available. This makes it possible to logically multiplex many users to one physical line, resulting in an abrupt decrease in communication charge for lease line services.

Unfortunately, this kind of lease line services using packet exchange networks are faced with the risk of large influenceability in communication cutoff events due to the fact that many users are logically multiplexed together to one physical line. One known countermeasure taken by most telecommunication carriers against this risk is to design communication paths by using the OAM and/or APS technique to have redundancy capabilities. However, it cannot be said that this approach is fully successful when supposing large-scale disasters occurring due to earthquakes, electrical power failures, etc. One traditional remedy for this problem is that a user makes contracts with a plurality of different communication carriers to thereby establish by himself the communication path redundancy. But, this does not come without accompanying penalties which follow: an increase in contract fee, and botheration as to the user's time-consuming and troublesome works including his or her manual operations for detecting an operation failure in a normally used communication network of one carrier and for switching it to a backup-side communication network of another carrier according to the user's own judgment on a case-by-case basis.

Recently, an advanced communication path redundancy service has become commercially available by business collaboration between different communication carriers. Providing this kind of service makes it unnecessary for users to manually switch between communication networks of such carriers. Instead, in order to establish the intended redundancy of the same level as traditional cases, users are required to install an extra dedicated device or equipment for achieving carrier accessability (referred to hereinafter as "user access device") at every user base point and also to perform carrier switching at such user point. This user access device is needed to be managed by the carriers; however, a special-purpose network to be used by the carriers for device management—i.e., management network, such as network management system (NMS)—is unable to expand to the extent that covers these user sites. In view of this, attempts are usually made to perform the so-called "in-band" remote control using the same communication network as that for data transmission/reception.

It should be noted here that a carrier which is under direct contract with users is called the first carrier whereas a carrier which ties up with the first carrier to establish a backup communication pathway is called the second carrier. The user access device is the one that is designed for direct accommodation of users; so, this device is to be managed by the first carrier having direct contracts with these users. An exemplary system procedure therefor includes the steps of sending a control frame insertion command from a management network of the first carrier to a communication device of the first carrier, causing the communication device that received this command to generate a control frame, and sending this frame to a destination device—here, a target user access device that becomes the object to be controlled. This user access device notifies either its response or device alarm. To do this, it transmits the control frame to the communication device of the first carrier. This control frame is subjected to termination processing by the first carrier's communication device. Then, its contents are notified to the first carrier management network.

In the case of such in-band remote control, a control frame and usual data frames are sent together via the same communication path. Consequently, designing a usual frame transfer path to have redundancy leads to establishment of the redundancy of a remote control path. For example, in case the carrier's communication network is of the Ethernet™ type, Ethernet OAM or APS is employable in conformity to ITU-T Recommendation Y.1731 (OAM functions and mechanisms for Ethernet based networks), IEEE 802.1ag/D8.1 (Connectivity Fault Management), or ITU-T Recommendation G.8031/Y.1342 (Ethernet Protection Switching).

SUMMARY OF THE INVENTION

The above-stated remote control redundancy is merely one of logical communication path redundancy techniques.

Accordingly, once the first carrier's communication device for direct accommodation of user access devices fails to operate properly, these user access devices can loose their controllability in unison. This is because the first carrier's communication network (i.e., management network) and the user access devices are linked by single-point connection methods. This means that a single-point operation fault causes the communication network to become uncontrollable. Thus, it cannot be said that the system fault tolerance is improved by the carrier redundancy.

To avoid this risk, a need is felt to design the system so that the individual user access device is linked by multi-point connection to the first carrier management network. To this end, three major approaches are conceived as will be set forth below.

The first approach is to arrange the first carrier's communication device per se to have the redundancy capability, which device is for direct accommodation of user access devices. By doing so, it is possible to avoid the risk of communication shutdown occurring due to single-point malfunction. However, this is the redundancy only for the same user within the same carrier's communication range; so, user accommodation at physically the same point is assumed. This does not lead to the improvement of the fault tolerance against wide-scale disasters, which is the primary objective of the carrier redundancy.

The second approach is to use a method for sending a control frame insertion command from the first carrier's management network directly to the second carrier's communication device. In practical applications, however, this is unfeasible because the first and second carrier management networks which are managed by different system administrators are not directly linked together in most cases.

The third approach is to use a method of sending back or "folding back" a control frame, which was inserted into a properly operating communication device of the first carrier, by a user access device which is at the line end opposite to a user access device that is the object to be controlled. Typically, the lease line service is the one that provides physical or logical one-to-one interconnection between users' communication tools. Accordingly, for each user access device, there must exist without exceptions a user access device at the opposite end thereto through the carrier's communication network. This opposite user access device is operatively associated with the communication networks of the first and second carriers as linked thereto and functions as the only point capable of performing send-back of the control frame. Further, it is a common way to install these opposing user access devices at physically spaced-apart base points so that it rarely happens that it becomes unable to give access to both devices at a time from the first carrier network even upon occurrence of a wide-scale disaster. However, in view of the fact that the in-band remote control scheme is such that a control frame and usual data frame are sent together over the same channel, it has been impossible to achieve return transmission passing through a "third" carrier which does not exist in the usual frame transfer path. If an attempt is made to allocate a dedicated channel which is exclusively used for the control frame to be returned, i.e., virtual private network (VPN), two separate VPNs must be allocated on a per-user basis: one is devoted to the usual frame transmission; the other is for the control frame transfer. This would result in a decrease by half in number of users accommodatable in a single communication system, which leads to half-reduction of the low-cost advantage as originally attainable by the logical multiplexing architecture. This poses serious problems in the case of VLAN-based VPNs which are less in number of accommodated users.

As a solution to the above-stated problems, this invention provides a packet communication system of the type having a user access device which is installed at a user base point for permitting a user terminal to be linked to any one of a plurality of carriers, a plurality of communication networks of carriers for accommodation of the user access device, communication devices making up them, and a carrier management network for control and management of the user access device and the communication devices. The user access device is the one that is managed by at least one carrier of the plurality of carriers, which is connected to the user access device. Typically, two or more user access devices are placed to spatially oppose each other with a carrier network being interposed therebetween. The communication device is operatively responsive to receipt of a control frame insertion command that is sent from the carrier management network, for transmitting a control frame which is added control frame transfer information that contains data indicating that the processing to be done at a destination device is whether termination or send-back. A user access device which is the destination of the control frame operates upon receipt of the control frame to extract therefrom the control frame transfer information. If this information indicates the termination, perform termination processing at itself. Alternatively, if the information extracted indicates the send-back, add thereto a header necessary for execution of the send-back processing and then transfer it.

More specifically, one principal feature of the communication system of this invention lies in that table information for control of OAM or APS is used in cases where OAM or APS is implemented between the opposing user access devices in the process of conducting a search for the header necessary for the send-back.

Another feature of the communication system is that during the search for the header needed for the send-back, header information is used, which has been added to the control frame received.

According to this invention, a communication path redundancy service using network resources of two or more carriers is provided to users; so, in the case of access devices being installed at user base points, even when operation failure occurs in one carrier's communication network, it becomes possible to retain a remote control path by maximally utilizing another carrier's communication network. This is achievable successfully without having to allocate thereto any special VPN resources for the remote control use. Thus it becomes possible to provide users with lease line services of high reliability at low costs.

BRIEF DESCRIPTION OF THE DRAWINGS

FIG. 7 is a diagram showing a header processing table which is stored in an input header processing unit 103 of FIG. 5.

FIG. 8 is a diagram showing a frame transfer table that is held in a frame interexchange unit 11 of FIG. 5.

FIG. 9 is a diagram showing an OAM/APS table held by an OAM/APS control unit 109 of FIG. 5.

FIG. 14 is a diagram showing a node management table owned by the node manager unit 12 of FIG. 5.

DETAILED DESCRIPTION OF THE INVENTION

Embodiments of this invention will be described with reference to the accompanying drawings below.

Embodiment 1

Figure 1:
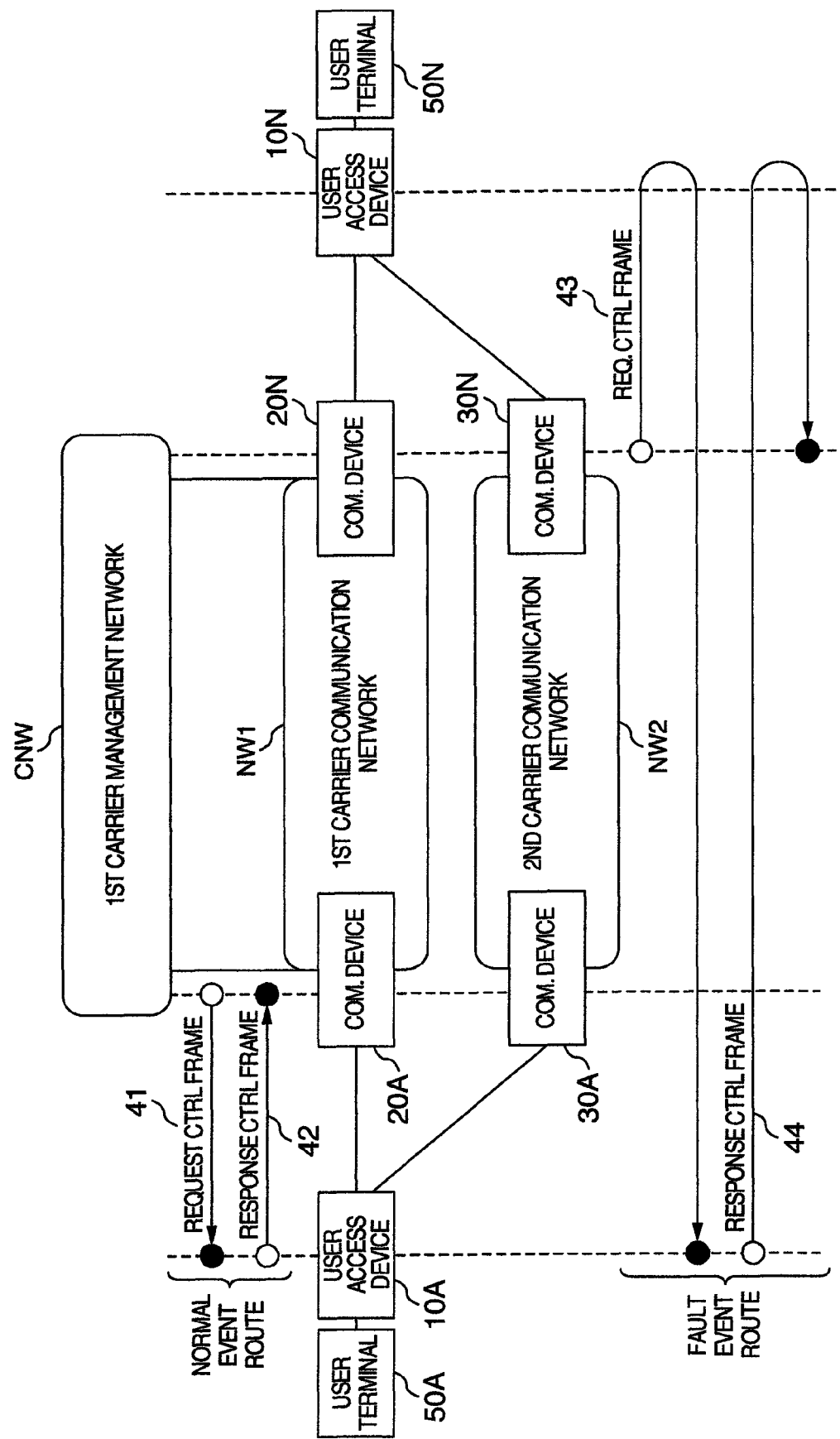
FIG. 1 is a diagram showing one example of the communication system of this invention.

FIG. 1 shows a packet data communication (PDC) system in accordance with one embodiment of this invention.

A user access device 10A is connected via two or more communication pathways to a user access device 10N, which is installed at a position distant from the device 10A. These communication paths are a communications network NW1 of a first carrier for performing management of the user access devices under establishment of communication contracts with users or subscribers and a communications network NW2 of a second carrier for providing backup lines in collaboration with the first carrier. Each user access device 10A, 10N is operatively associated with a user communication tool, i.e., user terminal 50A, 50N for direct accommodation thereof. The user access device is connected directly to respective communication devices making up the first carrier communication network NW1. Note here that communication paths between the user access devices and communication devices may be physical lines or, alternatively, communication links.

Between the user access devices 10A and 10N, Ethernet™-level operational administration and maintenance (OAM) and automatic protection switching (APS) are put in execution. The first carrier communication network NW1 is set up as a currently-used or "main" system whereas the second carrier communication network NW2 is for use as a backup or "sub" system. Each user access device verifies the normality of the first carrier communication network NW1 and second carrier communication network NW2 by use of a connectivity check message (CCM) frame in conformity with the Ethernet™ OAM standards (ITU-T Recommendation Y.1731). Upon failure to receive the CCM frame from a user access device at the opposite line end, the communication shutdown of each carrier communication network is detected. If this is the case, a communication continuable carrier communication network is selected, and communication path/route switching is performed based on APS (ITU-T Rec. G.8031). This enables communications between respective user terminals to be almost perfectly made redundant between the carriers, thereby providing the intended lease line services of high reliability.

In FIG. 1, a remote control route with respect to the user access device 10A is also depicted.

In cases where a communication device 20A of the first carrier is free from operation faults, this communication device 20A is operatively responsive to receipt of a control frame insertion command from the first carrier's management network CNW, for transmitting a request control frame 41 to the user access device 10A. Upon receipt of this frame, the user access device 10A sends, as its reply thereto, a response control frame 42 to the communication device 20A. Stated above is the remote control route in normal events.

On the other hand, in a case where an operation fault occurs at the first carrier's communication device 20A, a communication device 20N is expected to receive the control frame insertion command from the first carrier's management network CNW. Then, this device sends a request control frame 43 to the user access device 10N, which performs send-back or "foldback" processing, thereby causing the frame to reach the user access device 10A by way of the second carrier's communication network NW2. The user access device 10A sends, as its reply thereto, a response control frame 44 to the user access device 10A. The user access device 10N performs the send-back processing, resulting it reaching the communication device 20N. Mentioned above is the remote control route in an operation fault occurrence event.

Figure 2:
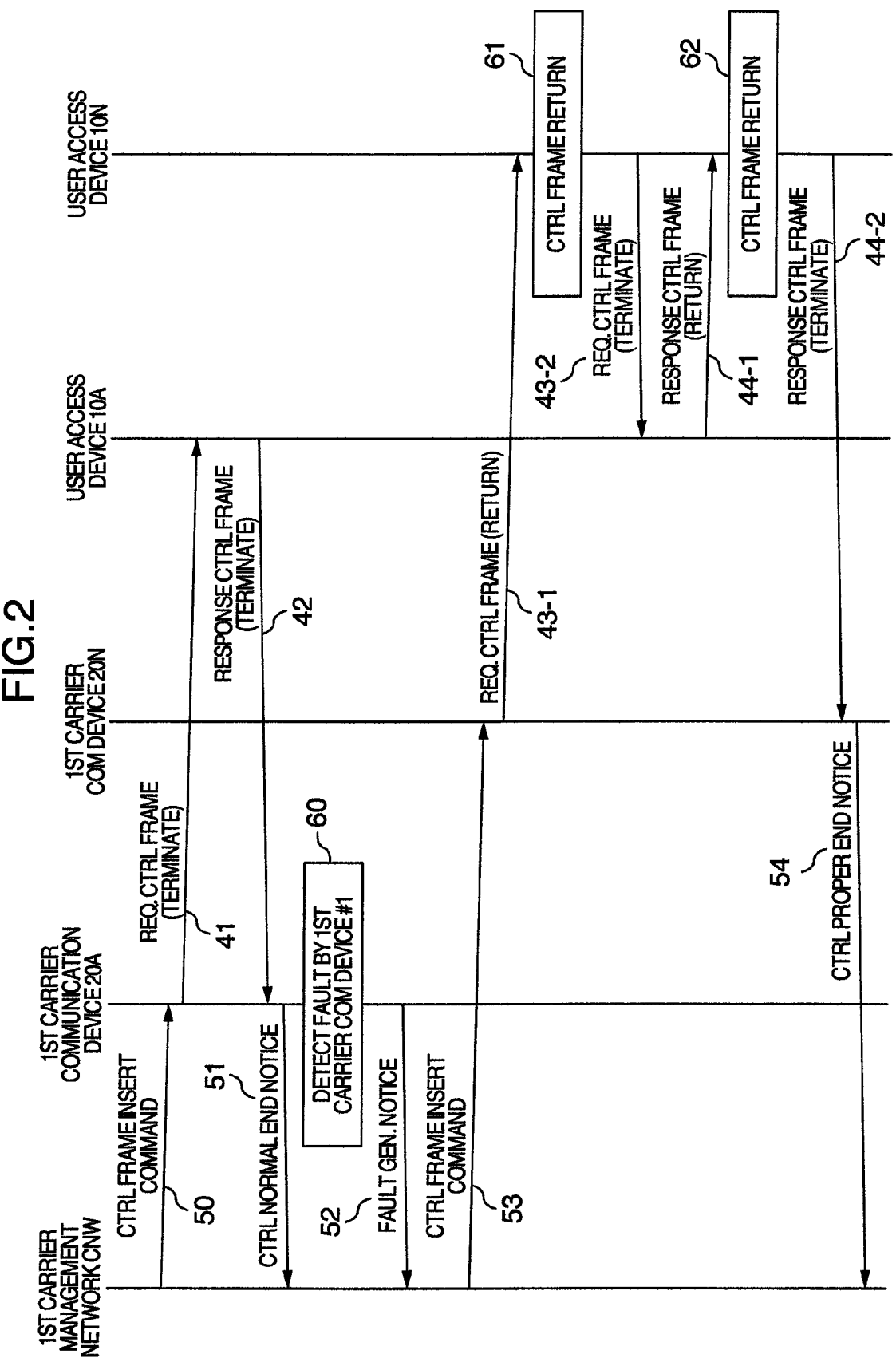
FIG. 2 is a diagram showing one exemplary sequence of remote control to be performed by the communication system of this invention.

FIG. 2 shows a remote control sequence in the communication system embodying the invention.

Using FIG. 2, an explanation will be given of remote control methodology of the user access device 10A in the communication system of this embodiment. Remote control of the user access device 10N is similar thereto, except that the control frame insertion point becomes reversed.

Each user access device is normally under management of the first carrier. In cases where the communication device 20A is out of abnormality, a control frame insertion command 50 is sent from the first carrier management network CNW to the communication device 20A. Upon receipt of this command, the communication device 20A performs processing for insertion of the request control frame 41 aimed at the user access device 10A. This request control frame 41 has a payload which contains control frame transfer information indicating that a device with its address identical to a destination address is required and authorized to perform the termination processing of this frame; addition of it as a terminated end to the request control frame 41 is instructed by the first carrier management network CNW. Upon receipt of the frame, the user access device 10A analyzes this frame. When it is made sure that the frame is aimed at itself and that the above-stated control frame transfer information indicates the termination, the user access device 10A performs the termination processing.

The user access device 10A performs, as its responsive operation, the processing for inserting the response control frame 42 aimed at the communication device 20A. The user access device 10A is able to determine or "judge" from certain information, such as a virtual local area network (VLAN) header or else, that the request control frame 41 received has been sent via the normal-event remote control route; so, a flag or code indicative of the termination is added to the control frame transfer information of the response control frame 42. Upon receipt of it, the communication device 20A analyzes this frame to determine whether the frame is aimed at itself and whether the control frame transfer information indicates is to be terminated or not. When these are made sure, the device 20A terminates the response control frame 42 at itself and then sends its contents to the first carrier management network CNW, along with a control normality notice 51.

Stated above are the remote control route and method in normal events with no operation faults.

On the other hand, in a case where the first carrier's communication device 20A detects occurrence of a certain kind of device malfunction at a step 60 shown in FIG. 2, when it is judged that communications with the user access device 10A are no longer possible, the device 20A sends it to the first carrier management network CNW in the form of a fault occurrence notice 52. An example of the communication device 20A's malfunction detection method is keep-alive check with respect to the communication device 20A from the first carrier management network CNW. Another example is a process of reciprocally exchanging CCM frame between another user access device of the first carrier communication network NW1 and the user access device 10A and for detecting device malfunction based on failure to receive the CCM frame.

The first carrier management network CNW is responsive to receipt of the fault occurrence notice 52, for changing the control frame insertion point from the communication device 20A to communication device 20N. Then, it sends out to the communication device 20N the control frame insertion request 53 aimed at the user access device 10N. Upon receipt of this request, the communication device 20N performs the processing for insertion of a request control frame 43-1 which has originally been sent with the user access device 10N as a target or "recipient" device. This request control frame 43-1 has its payload, to which the control frame transfer information is added as send-back in accordance with an instruction from the first carrier management network CNW. In responding to receipt of the frame, the user access device 10N analyzes this frame. When it is affirmed that a presently designated recipient is itself and also that the control frame transfer information indicates send-back, the device 10N performs the processing for returning—also called the fold-back or "echoing" in some cases—of the request control frame 43-1 at step 61 in FIG. 2. This processing includes the steps of conducting a search for a header aimed at the user access device 10A, adding it thereto, and modifying the control frame transfer information of the received request control frame 43-1 so that its indication of the send-back is changed to termination. When the send-back processing at step 61 of FIG. 2 is completed, the user access device 10N sends out a request control frame 43-2 aimed at the user access device 10A. In response to receipt of this frame, the user access device 10A analyzes it to make sure that its destination is itself and that the control frame transfer information indicates that itself is the terminate end; if so, perform termination processing of the request control frame 43-2.

The user access device 10A performs, as its reply, the processing for insertion of a response control frame 44-1 which is to be sent to the user access device 10N. As the user access device 10A is able to judge from certain information, such as VLAN header or else, that the request control frame 43-2 now received has been sent via the fault-event remote control route, a flag or code indicative of the send-back is added to the control frame transfer information of the response control frame 44-1. Upon receipt of it, the user access device 10N analyzes it to determine whether the frame is aimed at itself and whether the control frame transfer information indicates that this device per se is the terminate end. When these are verified, this device performs return processing of the response control frame 44-1 at step 61 of FIG. 2 and then generates and sends out a response control frame 44-2 aimed at the first carrier communication device 20N. Return processing 62 includes the steps of searching for a header aimed at the communication device 20N, adding it thereto, and updating the control frame transfer information of the received response control frame 44-1 so that the send-back is changed to termination. Upon receipt of it, the communication device 20N analyzes the frame to verify that its destination is itself and that the control frame transfer information indicates that itself is the termination; if so, perform the termination processing of response control frame 44-2 and then sends out its contents to the first carrier management network CNW together with a control normality notice 54.

Discussed above are the fault-event remote control route and method.

Figure 3:
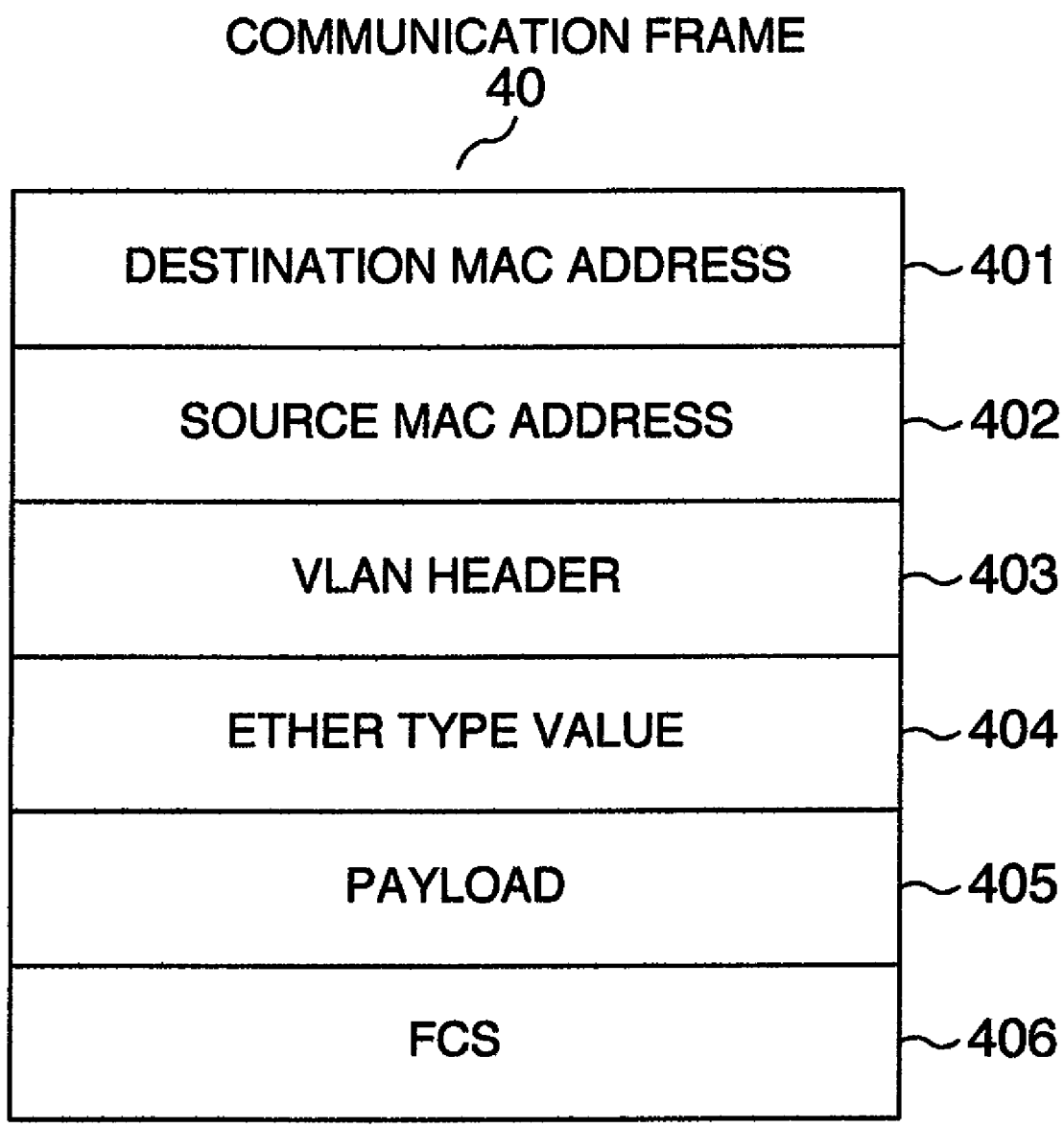
FIG. 3 is a diagram showing a format of a communication frame which flows in the communication system of this invention.

FIG. 3 shows a format of communication frame 40 in the communication system embodying the invention, which frame includes the control frames 41 to 44 stated supra.

The frame for use in this communication system is arranged to have a media access control (MAC) address 401 of a destination, MAC address 402 of a transfer source, virtual LAN (VLAN) header 403, MAC header with Ether-type value 404 indicative of the kind of a following header, payload 405, and frame check sequence (FCS) 406.

To the destination MAC address 401 and transfer-source MAC address 402, there is set up a MAC address of any one of the user terminals 50A-50N, user access devices 10A-10N, and communication devices 20A-20N and 30A-30N. The VLAN header 403 indicates a VLAN ID value (VID#), which is for use as a flow identifier.

Figure 4:
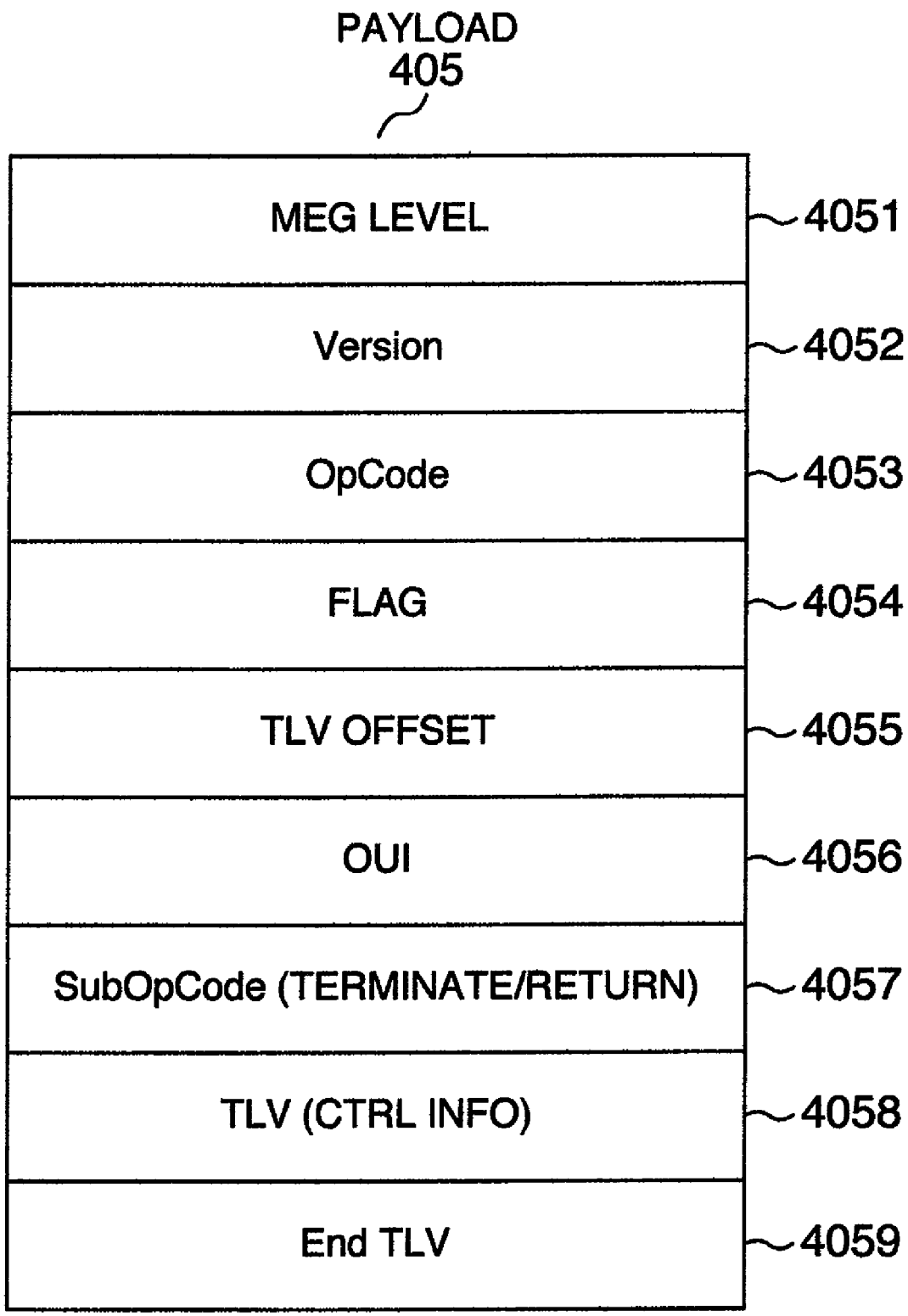
FIG. 4 is a diagram showing a format of payload of a control frame flowing in the communication system of this invention.

FIG. 4 shows a format of the payload 405 of each of the control frames 41-44.

In this communication system, the user access devices 10A-10N and communication devices 10A-20N and 30A-30N are Ethernet™ OAM/APS implementable devices. In the Ethernet OAM, vendor-specific OAM (VSP) for realization of message exchange unique to a device/apparatus vendor is defined in addition to the above-stated CCM frame and an alarm indication signal (AIS) for notifying fault occurrence to another device. VSP is usable for the vendor's unique objectives; so, this VSP is used for remote control sessions in the illustrative communication system. For this reason, the control frames 40-43 are each arranged to have the format of VSP.

The payload 405 of control frames 40-43 consists essentially of several fields of a maintenance entity group (MEG) level 4051, version 4052, OpCode 4053, flag 4054, type-length-value (TLV) offset 4055, organizationally unique identifier (OUI) 4056, SubOpCode 4057, TLV (control information) 4058 and End TLV 4059.

To the field of MEG level 4051, a level of OAM implementation to be determined by the carrier is set up. Set up to the version field 4052 is a version of OAM. Set to the OpCode field 4053 is a value indicative of the kind of an OAM message. In the case of VSP, a request control frame such as VSP message (VSM) is typically set to a value "51" whereas a response control frame such as VSP reply (VSR) is set to "50." The flag 4054 is a field that is uniquely usable by the vendor so that its content is not definitely determined in the above-stated Recommendation. The TLV offset 4055 indicates the length of a fixed region up to TLV—in this system, this is set at a value "4," which is equal to an addition value of the lengths of OUI 4056 and SubOpCode 4057, although this value is freely determinable by the vendor according to its own judgment. The OUI 4056 indicates the ID code of a company or cooperation (vendor), which is set to "0" in this system, although its value is not defined in the Recommendation. The SubOpCode 4057 indicates the kind of VSP frame, which is for use as a field indicative of a control frame transfer processing method in this system, although its value is not defined in the Recommendation. If the device of interest is a terminate end, a value "1" is set thereto; if a send-back then a value "1" is set up. In this system, no other values are set in the SubOpCode 4057. The TLV 4058 is a payload of control frame, which is designed to store control information in this system, although this field is freely usable by the vendor. The End TLV 4059 indicates the end of the control frame payload, to which a value "0" is set up.

Figure 5:
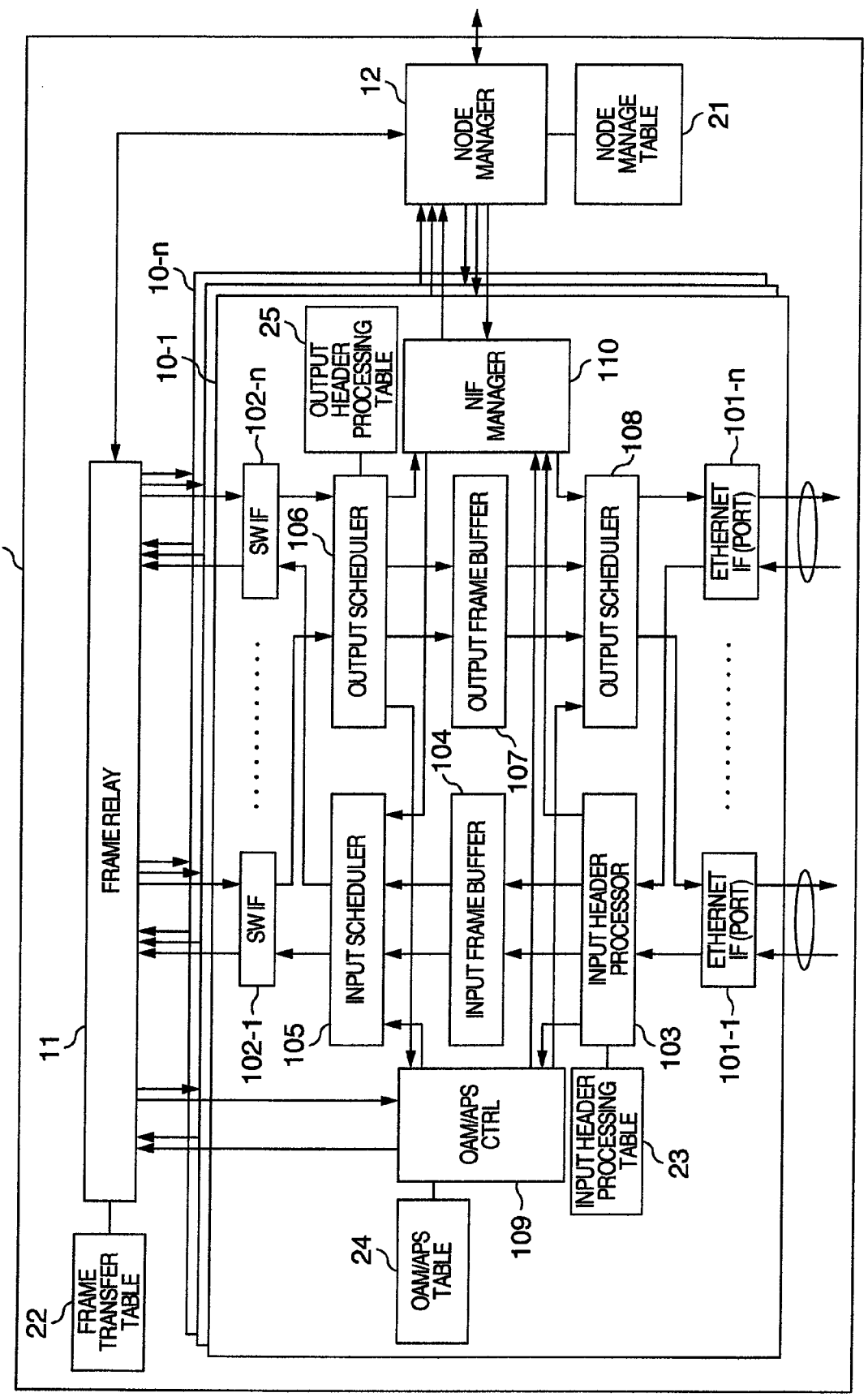
FIG. 5 is a block diagram showing a configuration of a user access device 10N.

FIG. 5 shows, in block diagram form, a configuration of the user access device 10N of FIG. 1. Other user access devices and communication devices used in this embodiment system may also be configured in a similar manner.

The user access device 10N is generally made up of a plurality of network interface (NIF) boards 10 (10-1 to 10-$n$), a frame interexchange or "relay" unit 11 coupled to these NIFs, and a node management unit 12 for managing an entirety of the device shown herein.

Each NIF 10 has a plurality of input/output (I/O) line interfaces 101 (101-1, 101-2, . . . , 101-$n$) functioning as communication ports, and is connected to other devices via these ports. In this embodiment, the I/O line interfaces 101 are line interfaces for the Ethernet™ use.

Each NIF 10 includes an input header processing unit 103 which is connected to the I/O line IFs 101, an input frame buffer 104 which is coupled to the input header processor 103, and an input scheduler 105 coupled to the input frame buffer 104. Each NIF 10 also has a plurality of switching (SW) interfaces 102 (102-1 to 102-$n$) which are connected to the frame relay unit 11, an output frame header processing unit 106 that is coupled to these SW interfaces 102, an output frame buffer 107 coupled to the output frame header processor 106, and an output scheduler 108 coupled to the output frame buffer 107.

Note here that one SW interface 102-$i$ (i=1, 2, . . . , or n) corresponds to I/O line interface 101-$i$ so that an input frame as received by I/O line interface 101-$i$ is transferred to the frame relay unit 11 through SW interface 102-$i$. An output frame which is distributed or "sorted" from the frame relay 11 to SW interface 102-$i$ is sent out toward an output line via I/O line interface 101-$i$. With this arrangement, each of the input header processor 103, input frame buffer 104, input scheduler 105, output frame header processor 106, output frame buffer 107 and output scheduler 108 is of an independent structure on a per-line basis; thus, it will never happen that frames of respective lines are mixed together.

Figure 6:
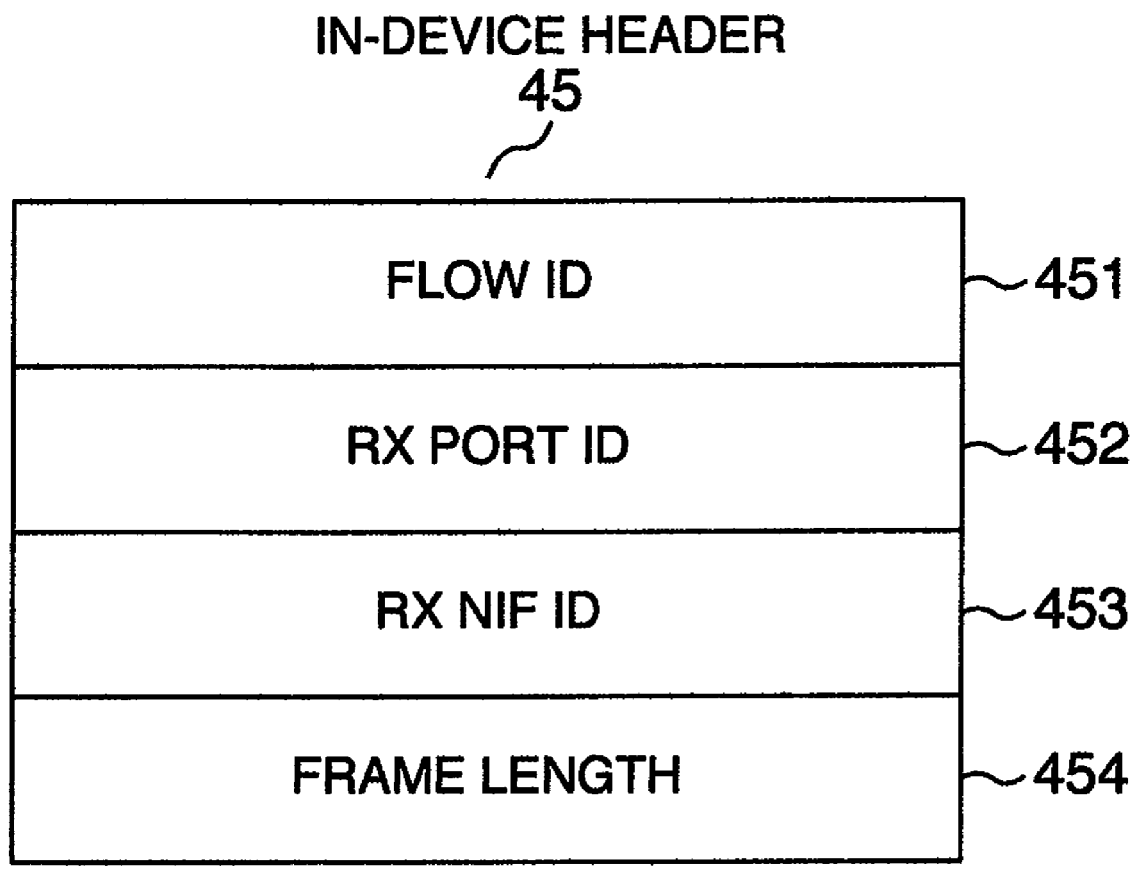
FIG. 6 is a diagram showing a format of an intra-device header which is added to an input frame of the user access device 10N.

The I/O line interface 101-$i$ is responsive to receipt of a communication frame 40 from its corresponding input line, for adding to this received frame an intra-device header 45 shown in FIG. 6. This header 45 consists essentially of a plurality of fields indicating a flow ID 451, reception port ID 452, reception NIF ID 453 and frame length 454.

At the time that the I/O line interface 101-$i$ added the intra-device header 45 to its received frame, the field of flow ID 451 is blank. To this field, an effective value is set up by the input header processor unit 103.

The input header processor 103 refers to an input header processing table 23 and adds the flow ID 451 to the intra-device header 45 of each input frame.

The input header processing table 23 is for use in the process of searching, with VLAN ID 231 as a search key, for a table entry indicating a tag processing 232 and VLAN ID 233, which becomes necessary in case the tag processing 232 is either conversion or addition, and also flow ID 234. Note here that the tag processing 232 indicates a VLAN tag processing method, to which is set up any one of transmission, conversion, addition and deletion the processing VLAN ID 233 is such that VLAN ID and class of service (CoS) are set up therein, wherein the former becomes necessary in case the tag processing 232 is either the conversion or addition.

The input header processor 103 searches for a table entry which corresponds to the value of VLAN ID (i.e., VID value or "VID#") that is indicated by VLAN header 403 of an input frame, and applies to the input frame the tag processing 232 indicated by this table entry, and then overwrites the flow ID 234 of such table entry onto the flow ID 451 of intra-device header 45. At this time, the destination MAC address 401 and transfer-source MAC address 402 are such that a per-port device-fixed setup value may be overwritten thereon; alternatively, a value which has been registered to the input header processing table 23 with respect to each flow ID may be overwritten. Note however that in the case of overwriting the per-port device-fixed setup value, it is necessary to let the destination MAC address be a multi-cast address. Even in this case also, the carrier communication network is the VPN by means of VLAN only, wherein user access devices are in one-to-one interconnection. Thus, the intended transfer is achievable without problems.

Further, the input header processor 103 performs header analysis to thereby verify whether Ether-type value 404 is the value of Ethernet OAM or not. As a result of this verification, if the input frame is not Ethernet OAM frame, the input header processor 103 stores it, without change, in the input frame buffer 104 on a per-line basis.

Alternatively, if the verification result reveals that the input frame is any one of Ethernet OAM frame and APS frame, payload analysis processing S100 is performed in a way as will be described later. After completion of the payload analysis processing S100, the input frame is transferred to any one of the OAM/APS control unit 109 and NIF management unit 110; alternatively, this frame is stored in input frame buffer 104 on a per-line basis; still alternatively, it is discarded.

When the frame is stored in input frame buffer 104, the input scheduler 105 reads it independently in a per-line manner, and then outputs it to one of SW interfaces 102-1 to 102-$n$, which corresponds to such line. The input scheduler 105 also performs the scheduling of readout sessions of an insertion frame from the OAM/APS controller 109 and/or NIF manager 110 and a frame from the input frame buffer 104. An examples of the insertion frame is a control frame-containing OAM/APS frame to be inserted from this device.

The frame relay unit 11 is responsive to receipt of input frames from SW interfaces 102-1 to 102-$n$ of respective NIFs 10, for specifying an output NIF and an output port ID from the frame transfer table 22 and for sending them to a corresponding SW interface 102-*i* as an output frame.

The frame transfer table 22 is used for lookup of a table entry that indicates the output NIF ID 224 and output port ID 225 with a combination of VLAN ID 221 and input NIF ID 222 plus input port ID 223 being as search key. Note here that the input NIF ID 222 and input port ID 223 are assigned to each SW interface of each NIF in a physically fixed manner, which is uniquely determinable by judging which one of SW interfaces was used to receive the input frame. The frame relay 11 uses it to search the frame transfer table 22.

The output frame that was received by each SW interface 102 is supplied in sequence to the output header processor 106. Although in this embodiment the format conversion of from input frame to output frame is performed by the input header processor 103, this format conversion function may alternatively be executable by the output header processor 106—in such case, this output header processor 106 is arranged to have an output header processing table 25 that stores information needed for the header conversion. In the case of the header conversion being performed by the input header processor 103, the output header processor 106 operates to store output frames that are received from SW interfaces 102 in the output frame buffer 107 with no modification applied thereto.

The output scheduler 108 reads the frames from the output frame buffer 107 independently in units of lines and then outputs a frame to its corresponding I/O line interface 101. The output scheduler 108 also performs scheduling of the readout of an insertion frame(s) from OAM/APS controller 109 and/or NIF manager 110 and the frame readout from output frame buffer 107. An example of the insertion frame is OAM/APS frame which contains a control frame to be inserted from the device of interest. The I/O line interface 101 removes the intra-device header 45 from the output frame received and then sends forth an output frame toward its associated output line in the format shown in FIG. 3.

The OAM/APS controller 109 is a function block which performs the processing for termination of OAM and APS frames received from the input header processor 103 and inserts these OAM and APS frames into each scheduler.

An OAM/APS table 24 shown in FIG. 9 is the one that is used to search for a table entry while letting a flow ID 241 be a search key, which entry indicates OAM information 242, APS information 243, VLAN ID 244, transfer-source MAC address 245 and destination MAC address 246. The OAM information 242 contains a state of loss of continuity (LOC) indicating communication cutoff occurrable due to the failure to receive CCM frame. The APS information 243 includes a paired NIF ID 2431 and paired port ID 2432. In case APS is implemented, a redundant communication path is set up for route redundancy between different ports within the same NIF or, alternatively, between different NIFs. In other words, a single flow performs APS bridging between different ports within the same NIF or between different NIFs. The ID of such paired NIFs and the ID of port are indicated by the paired NIF ID 2431 and pair port ID. In the case of the APS bridging between NIFs, a value indicative of another NIF is set in the pair NIF ID 2431. The VLAN ID 244, transfer-source MAC address 245 and destination MAC address 246 are the information to be used when inserting OAM and APS frames.

The OAM/APS controller 109 updates the OAM information 242 and APS information 243 of OAM/APS table 24 if the OAM and APS frames received from the input header processor 103 are to be subjected to the termination. Alternatively, if the OAM and APS frames received from input header processor 103 are control frames to be subject to the send-back or "echoing" processing, the controller 109 performs within-the-same-NIF return processing S300 as will be described later. It also operates to insert the OAM and APS frames into each scheduler in a way depending on the setup and state of the OAM/APS table 24. A more detailed explanation is eliminated herein as such explanation is believed to be unnecessary for the understanding of this invention.

Figure 10:
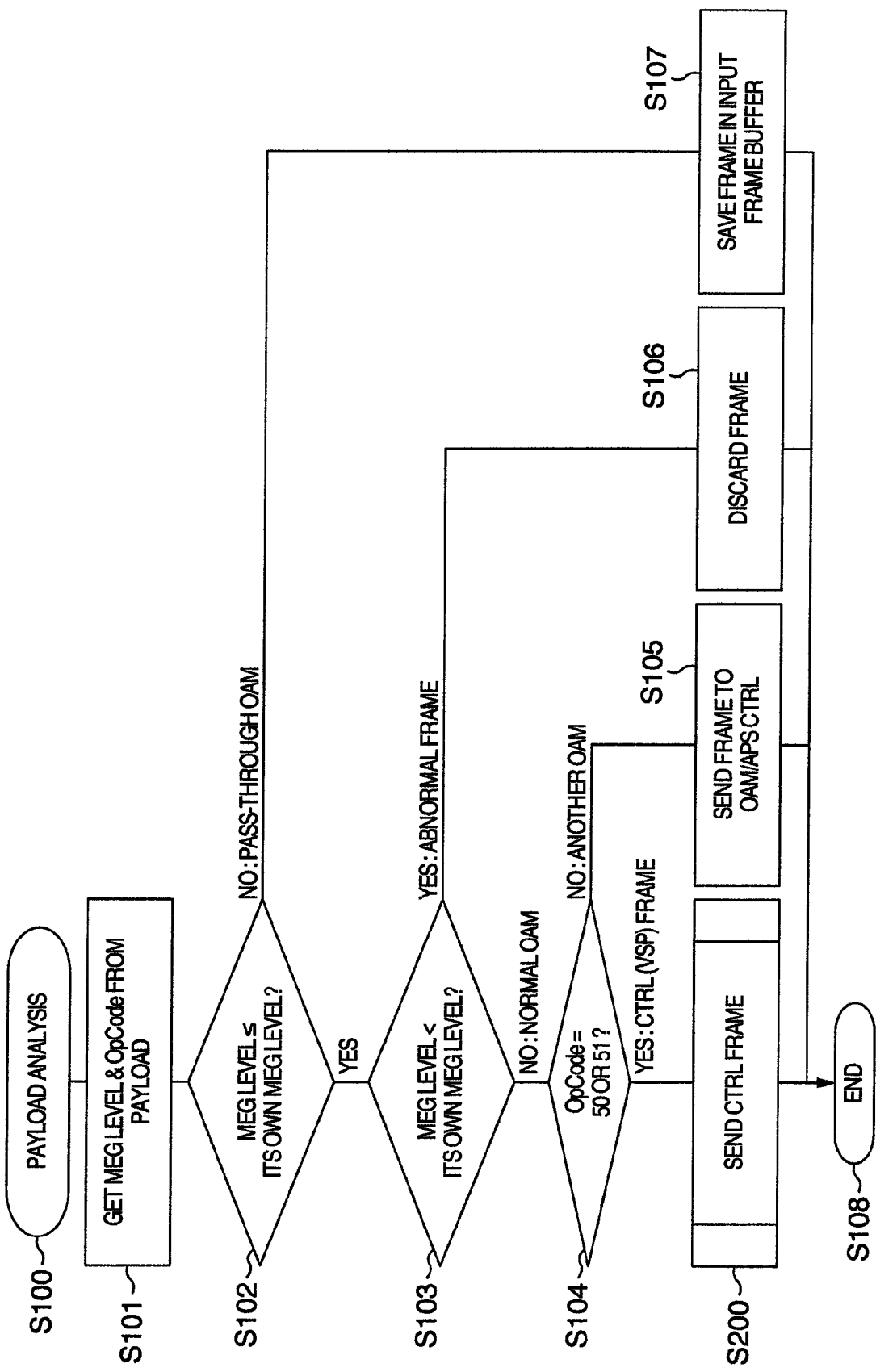
FIG. 10 is a flow diagram of a procedure of payload analysis processing S100 which is executed by an input header processing unit 103 of FIG. 5.

FIG. 10 is a flow diagram of the payload analysis processing S100 which is executed by the input header processor 103 shown in FIG. 5.

The input header processor 103 determines whether the Ether-type value 404 of an input frame is Ethernet OAM. If so, it acquires from the input frame's payload 405 both the MEG level 4051 and the OpCode 4053 (at step S101), and then performs large/small comparison of the acquired MEG level 4051 and MEG level that is presently set in the self device (at step S102). This MEG level being set in the self device indicates MEG level to be terminated thereat. Upon receipt of an OAM frame with its MEG level identical thereto, it is required to perform either the termination processing or the return processing. If the former is larger than the latter, it is needed to perform transmission or "pass-through" processing. If smaller, this must be an abnormal frame; so, it is necessary to discard such frame. In case the result of the comparison at step S102 reveals that the MEG level 4051 is less in value than the MEG level being set in the self device, an attempt is made to compare the MEG level 4051 to the MEG level being set in the self device (at step S103). If the self device's MEG level is not less than (identical to) the MEG level 4051, check a value of the OpCode 4053 that was acquired from the input frame (at step S104). If the OpCode 4053 has its value equal to "50" or "51" then it is determinable that this is VSP (control) frame; thus, perform control frame transfer processing S200, followed by completion of the procedure.

In the above-noted step S102, if the MEG level 4051 is larger in value than the self device's MEG level, the input frame is determined to be a transmission OAM frame; so, store it in the input frame buffer (at step S107) and then quit the procedure (at step S108).

At the step S103, if the MEG level 4051 is less than the self device's MEG level, the input frame must be an abnormal OAM frame; so, scrap it and then quit the procedure (at step S108).

In the step S104, if the OpCode 4053 has its value other than "50" and "51," the input frame is determined to be one of other OAM frames to be terminated; so, transfer it to the OAM/APS controller 109 and then quit the procedure (at step S105).

Figure 11:
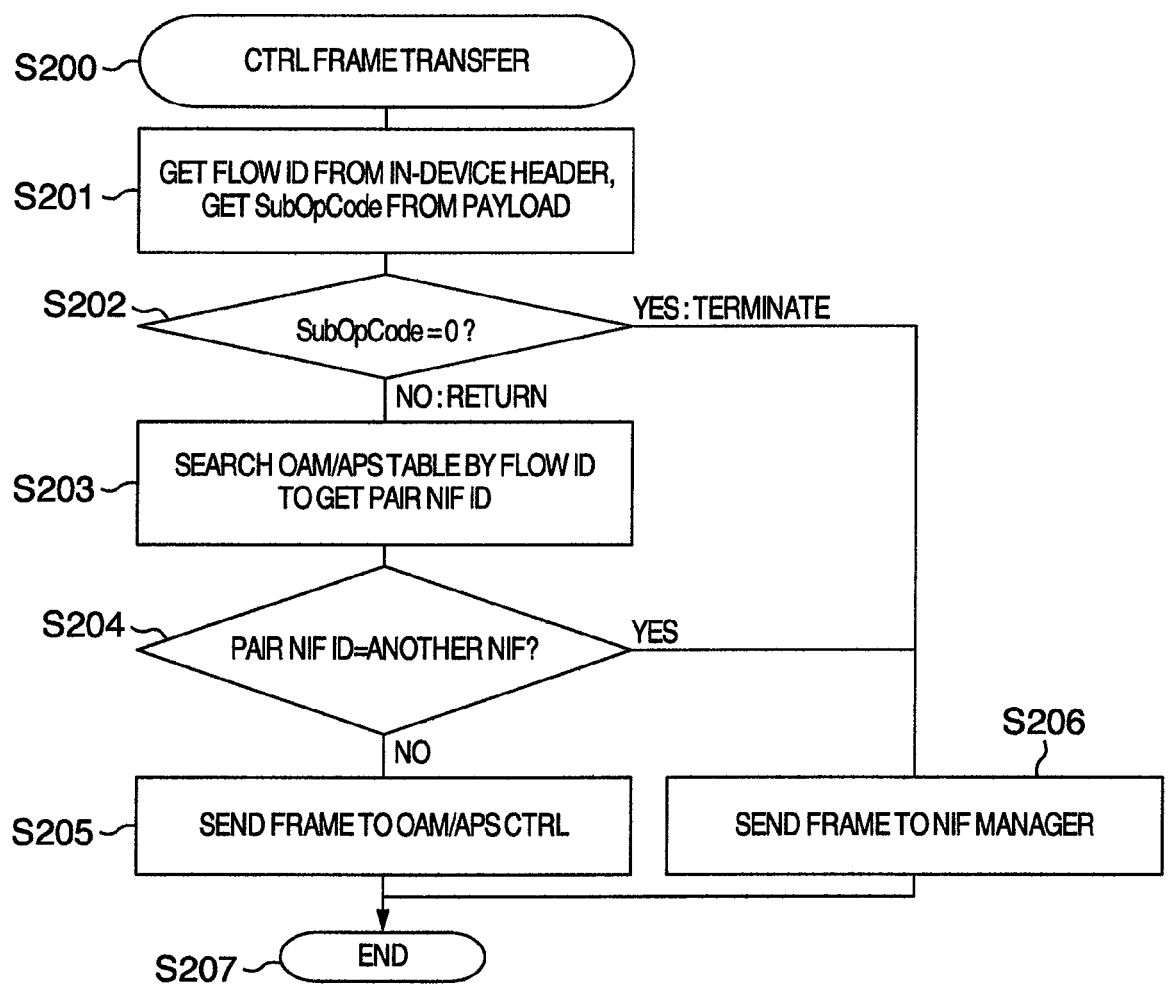
FIG. 11 is a flow chart of control frame transfer processing S200 to be executed by the input header processing unit 103 of FIG. 5.

In the control frame transfer processing S200 shown in FIG. 11, the input header processor 103 acquires the flow ID 451 from the intra-device header 45, acquires the SubOpCode 4057 from the payload 405 (at step S201), and determines whether this acquired SubOpCode 4057 has its value equal to "0" (at step S202). If the SubOpCode 4057 is not "0" (i.e., equal to "1"), use the acquired flow ID 451 to search the OAM/APS table 24 to thereby obtain the paired NIF ID 2431 of a table entry (at step S204) and then determines whether this acquired pair NIF ID 2431 is another NIF (at step S204). If NO at this step, it indicates that what is required now is to perform send-back processing within the same NIF. Thus, transfer the input frame to the OAM/APS controller 109, and then quit the procedure (at step S205).

In the step S202, if the SubOpCode 4057 is "0," this means that it is necessary to notify its contents to the first carrier's management network CNW. Thus, transfer the frame to the NIF manager 110, and then exit the procedure (at step S206).

Although not specifically illustrated in FIG. 11, those steps to be done thereafter include letting the NIF manager notify the node manager 12 of the contents of control frame and letting the node manager 12 notify such frame contents and others to the first carrier management network CNW.

In the step S204 above, if the pair NIF ID 2431 is another NIF, this means that it is necessary for the return processing to "stride" the NIF; so, transfer the frame to the NIF manager 110 and then exit the procedure (at step S206). Although not shown in FIG. 11, those steps to be performed thereafter include causing the NIF manager 110 to transfer it to the node manager 12 and letting the node manager 12 perform processing for send-back between NIFs in a way to be later described.

Figure 12:
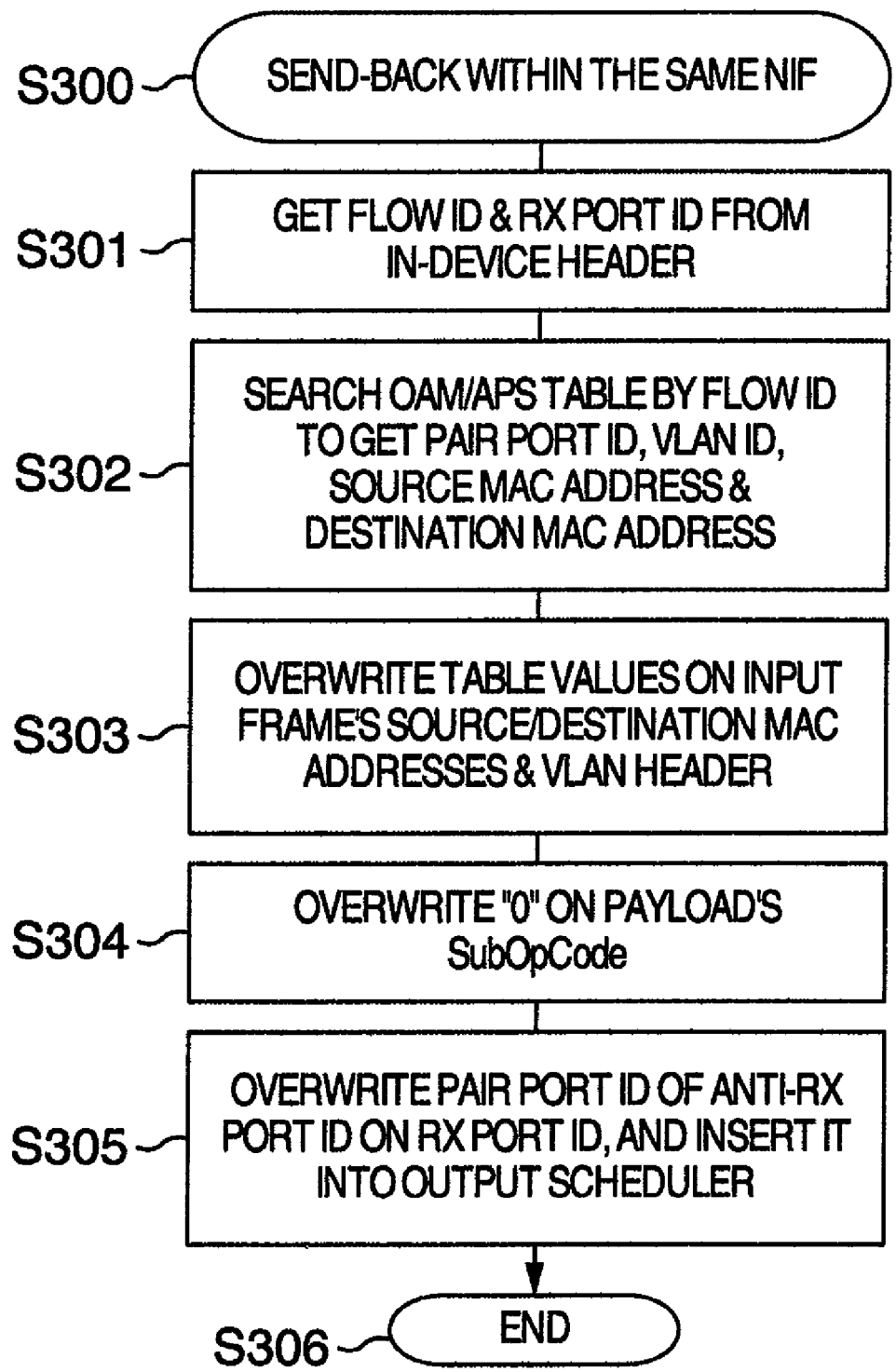
FIG. 12 is a flowchart of within-the-same-NIF returning processing S300 to be performed by the OAM/APS control unit 109 of FIG. 5.

FIG. 12 is a flowchart of the within-the-same-NIF return processing which is performed by the OAM/APS controller 109.

At step S301, upon receipt of a control frame indicating the need for send-back within the same NIF, the OAM/APS controller 109 acquires from the intra-device header 45 of such received frame the flow ID 451 and reception port ID 452. Then, at step S302, use this acquired flow ID 451 to search the OAM/APS table 24 to thereby acquire from a table entry the paired port ID 2432, VLAN ID 244, transfer-source MAC address 245 and destination MAC address 246. Then at step S303, overwrite these values obtained from the OAM/APS table 24 onto the input frame's destination MAC address 401 and transfer-source MAC address 402 plus VLAN ID of VLAN tag 403. Next, at step S304, overwrite "0" on the SubOpCode 4057 of payload 405, and change the setup from the send-back to termination. Then at step S305, overwrite the reception port ID 452 of intra-device header 45 of the input frame using the pair port ID 2432 that is not the reception port ID 452 of intra-device header 45 of the input frame, and insert the frame into the output scheduler 108. Thereafter, at step S306, quit the procedure.

Figure 13:
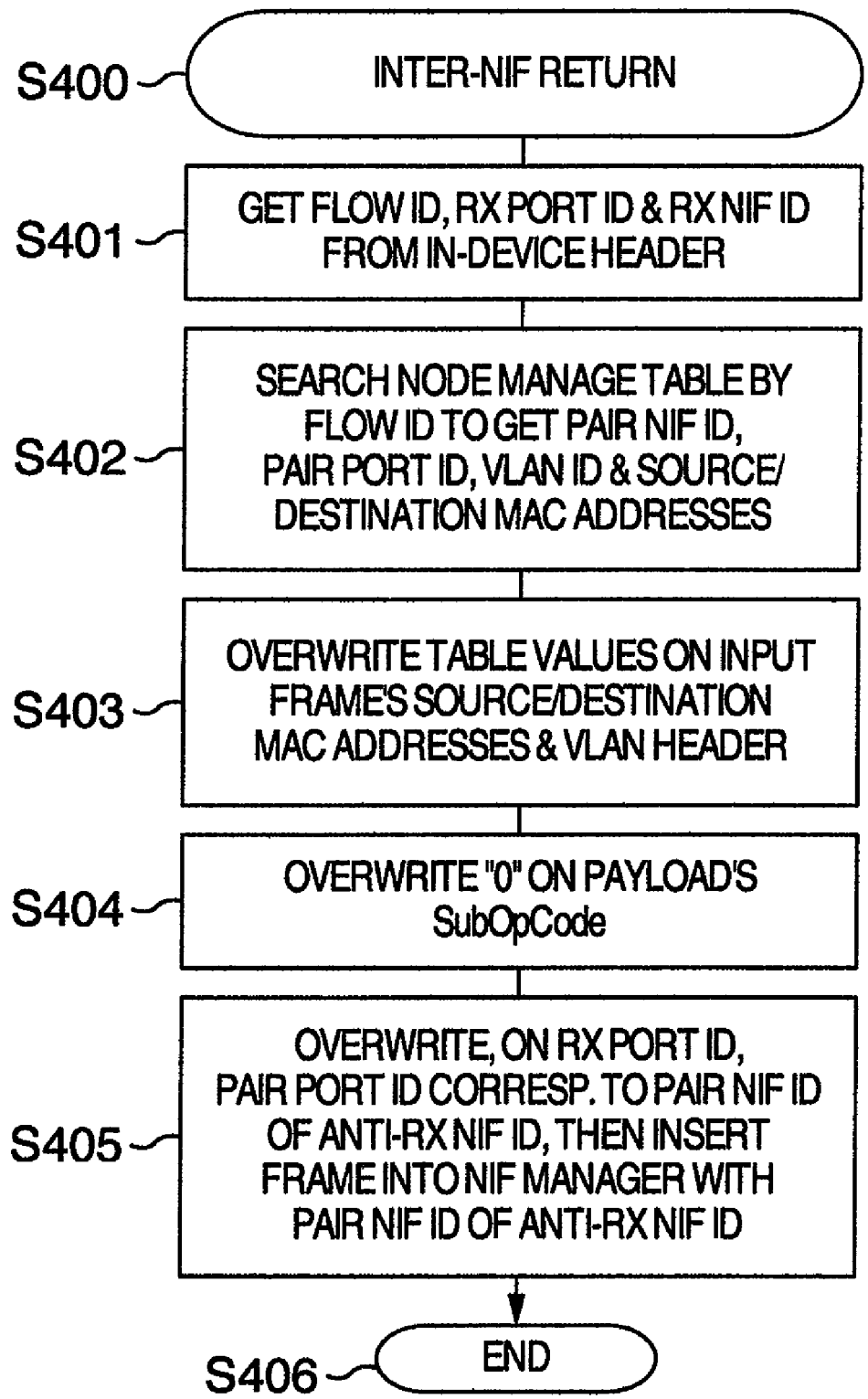
FIG. 13 is a flowchart of inter-NIF return processing S400 to be performed by a node management unit 12 of FIG. 5.

FIG. 13 is a flowchart of inter-NIF return processing S400 which is performed between NIFs by the node manager 12.

At step S401, upon receipt of a control frame indicating the need for send-back or "echoing" between NIFs, the node manager 12 acquires from the intra-device header 45 of such received frame the flow ID 451 and reception port ID 452 plus reception NIF ID 453. Then, at step S402, use the acquired flow ID 451 to search a node management table 21 shown in FIG. 14 to thereby obtain from a table entry a paired NIF ID 2121, pair port ID 2122, VLAN ID 213, transfer-source MAC address 214 and destination MAC address 215. Then at step S403, overwrite these values gained from the node management table 21 onto the input frame's destination MAC address 401, transfer-source MAC address 402 and VLAN ID of VLAN tag 403. Next, at step S404, overwrite "0" on the SubOpCode 4057 of payload 405, and change the setup from the send-back to termination. Then at step S405, overwrite the reception port ID 452 of intra-device header 45 of the input frame by use of the pair port ID 2122 corresponding to the pair NIF ID 2121 which is not the reception NIF ID 453 of intra-device header 45 of the input frame; then, insert this frame into the NIF manager 110 on the NIF board of the pair NIF ID 2121 that is not the reception NIF ID 453. Thereafter, exit the routine at step S406. Although not shown in FIG. 13, the NIF manager 110 with the control frame being inserted thereinto from the node manager 12 operates to insert the above-noted control frame into the output scheduler 108.

The node management table 21 shown in FIG. 14 is a table for management of the entire device, and is also a table used to conduct a search with the flow ID 211 being as a search key to thereby find the information for managing the entire device, such as the device's alarm status, setup states of various kinds of tables, etc. In view of this, the contents of the node management table 21 of FIG. 14 contain the contents of the OAM/APS table 24 stated supra. The APS information 212 and its associated data including the VLAN ID 213, transfer-source MAC address 214 and destination MAC address 215 are for use in the inter-NIF return processing S400. Note here that the NIF ID 213 of node management table 21 has no setting equivalent to the item of another NIF. Registered thereto are a NIF ID valid to every device and its corresponding pair port ID. A control route 2123 is for use in response control frame insertion processing S500, which is performed in responding to receipt of a request control frame. More precisely, when inserting a control frame into the control route in normal events, the control frame's SubOpCode 4057 is set to "0" (indicating the termination); when inserting such control frame into the control route in fault occurrence events, the control frame's SubOpCode 4057 is set to "1" (indicating the send-back).

What is obtained by combining together the above-stated processing procedures S100, S200, S300 and S400 is the control frame return processing 61, 62 shown in FIG. 2.

The node manager 12 is responsive to receipt of a request control frame, for extracting control information from TLV 4058 of a payload thereof and for causing the response control frame insertion processing S500 to get started after having done device setup.

Figure 15:
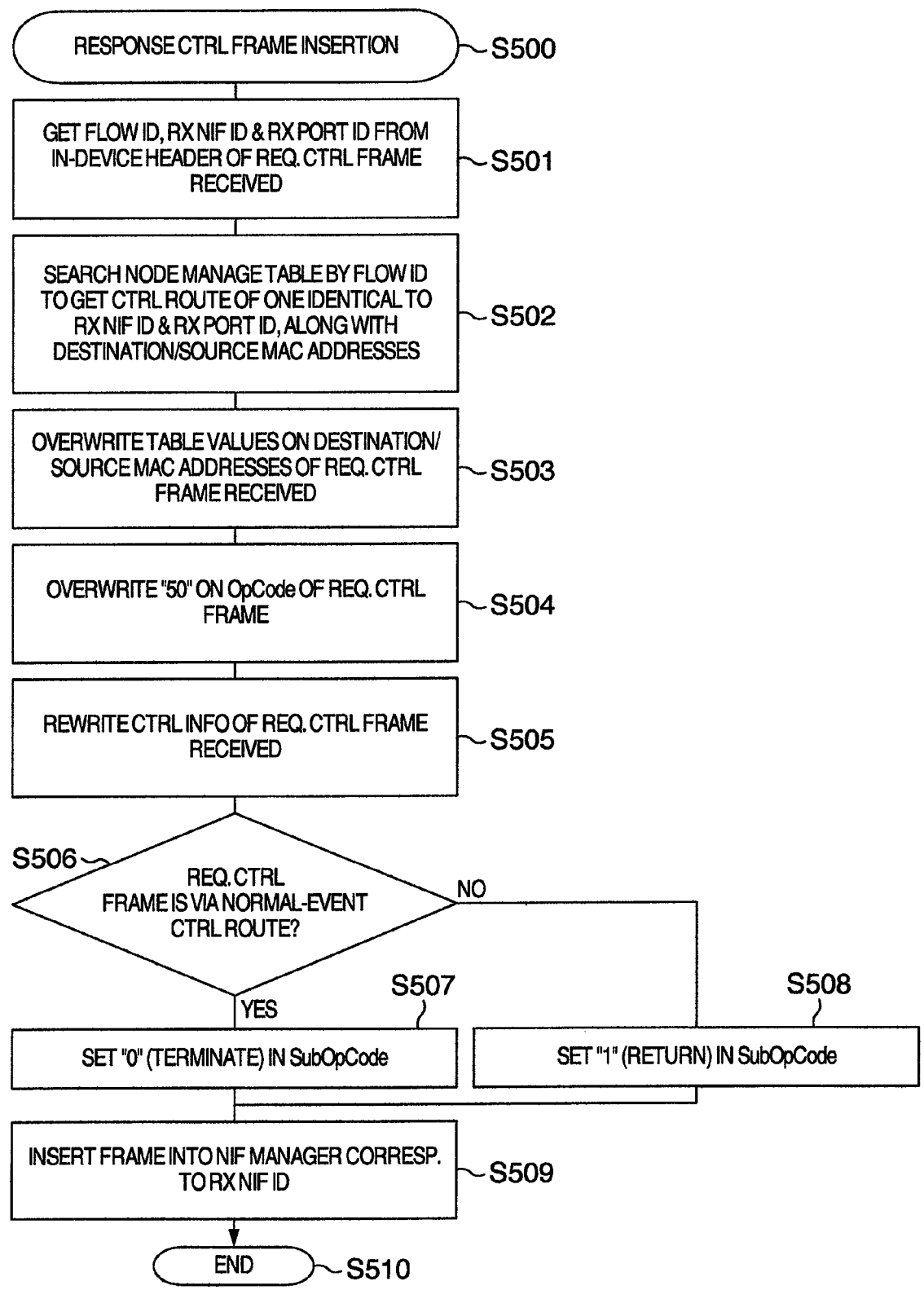
FIG. 15 is a flowchart of response control frame insertion processing S500 to be executed by the node manager 12 of FIG. 5.

FIG. 15 is a flowchart of the response control frame insertion processing S500 that is executed by the node manager 12.

At step S501, the node manager 12 acquires from the intra-device header 45 of the received request control frame the flow ID 451 and reception NIF ID 452 plus reception port ID 453. Then, at step S502, search the node management table 21 using the flow IF 451 to thereby acquire a control route 2123 which is identical to the reception NIF ID 452 and reception port ID 453 along with transfer-source MAC address 214 and destination MAC address 215. Next, at step S503, overwrite these table values onto the destination MAC address 401 and transfer-source MAC address 402 of the received request control frame. Then at step S504, overwrite on OpCode 4053 a value "50" indicating that the frame of interest is a response control frame. Then at step S505, rewrite the control information to information such as a command indicative of normal reception and/or device status. At step S506, determine whether the control route 214 that was obtained from the node management table 21 is for use in a normal event or in fault events. If Yes at step S506, i.e., when the control frame is for the normal event, then go to step S507 which sets "0" (termination) in the SubOpCode 4057. Then, at step S509, insert the control frame into NIF manager 110 that corresponds to the reception NIF ID 452, followed by quitting the processing required at step S510.

If No at step S506, i.e., if the received request control frame is the one that was received from a control route for use in fault events, then proceed to step S508 which sets up "1" (send-back) to the SubOpCode 4057 and then inserts the control frame into NIF manager 110 corresponding to the reception NIF ID 452, followed by exiting the procedure at step S510.

Although not specifically shown in FIG. 15, the NIF manager 110 into which the control frame was inserted from the node manager 12 inserts it into the output scheduler 108 in such a manner that it is output to a port corresponding to the reception port ID 453 of intra-device header 45.

Figure 16:
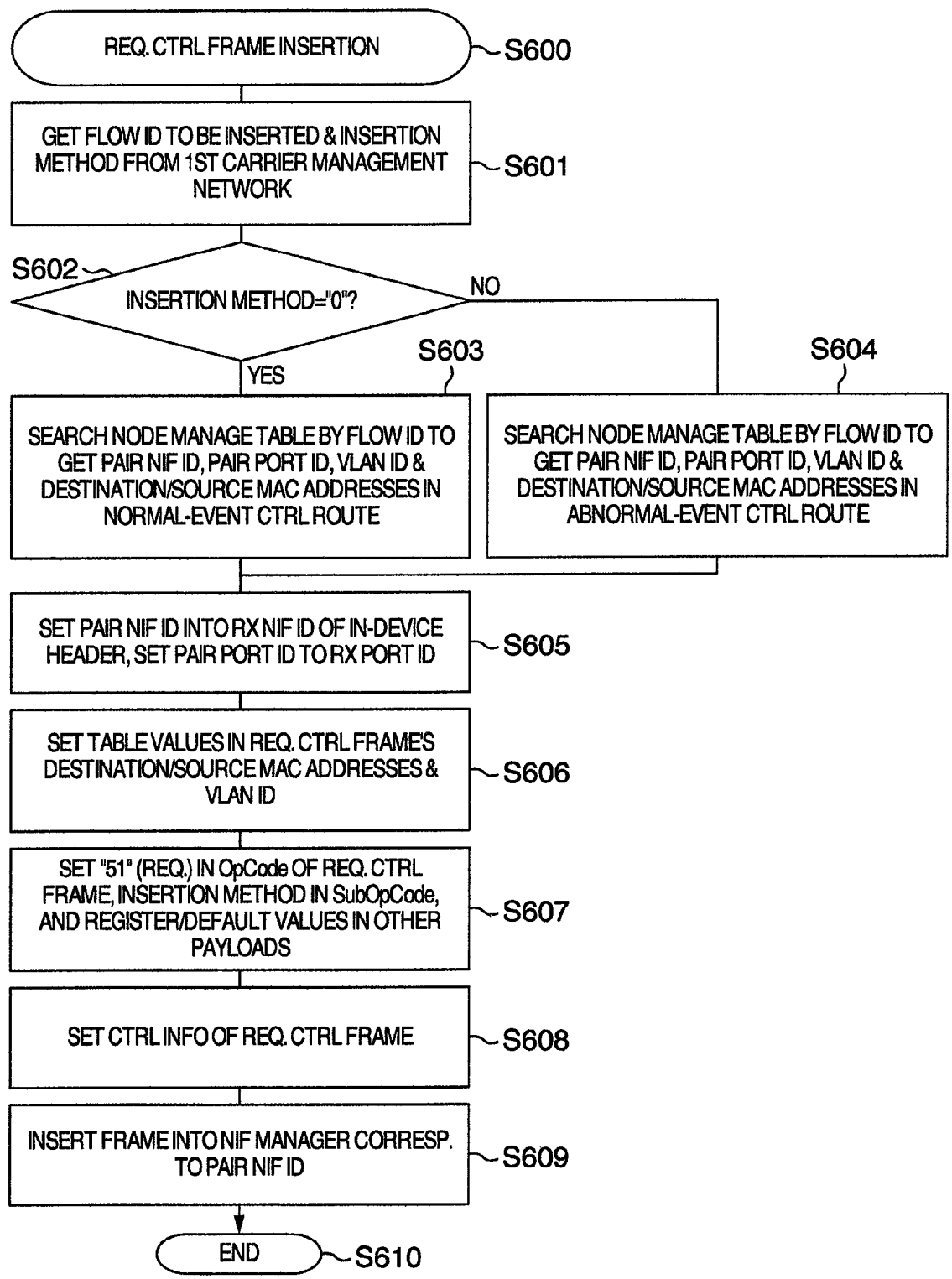
FIG. 16 is a flowchart of request control frame insertion processing S600 to be performed by the node manager 12 of FIG. 5.

FIG. 16 is a flowchart of request control frame insertion processing S600 which is performed by the node manager 12 in response to receipt of a request control frame insertion command from the first carrier's management network CNW shown in FIG. 2. This processing is for the first carrier's communication devices 20A-20N only.

Firstly at step S601, when receiving the request control frame insertion command from the first carrier management network CNW, the node manager 12 acquires an insertion destination flow ID and insertion method ("0" for termination, "1" for send-back) which are to be notified simultaneously. Then, at step S602, the manager checks whether the insertion method is termination (i.e., its value is "0") or not. If Yes at step S602, i.e., when the insertion method is termination ("0"), go to step S603 which causes the node manager 12 to search the node management table 21 using the flow ID to thereby obtain the pair NIF ID 2121 and pair port ID 2122 of a one with the control route 2123 being for the normal event along with VLAN ID 213, transfer-source MAC address 214 and destination MAC address 215 thereof. Next, at step S605, set up a pair NIF ID#3 2121 to the reception NIF ID 452 of intra-device header 45 while letting the pair port ID 2122 be set up to the reception port ID 453. Then at step S606, set up the above-noted table values in the destination MAC address 401 and destination MAC address 402 plus VLAN tag 403 of the request control frame. At this time, fixed or "default" values that are set up by registers or else are used for the other setup values of the VLAN tag. Then, go to step S607 which overwrites onto the OpCode 4053 a value "51" indicating that the frame of interest is a request control frame, and sets up the insertion method in SubOpCode 4057 while setting up the register-setup default values in other payloads, e.g., MEG level 4051, etc. Then proceed to step S608, which sets up to the control information a command and/or setup value(s) for control of the user access device 10A. Next, at step S609, insert the control frame into NIF manager 110 corresponding to the pair NIF ID 2121 that was obtained from the node management table 21, followed by quitting this frame insertion processing at step S610.

In the step S602, in case the insertion method is not "0," i.e., the processing required is send-back, the routine goes to step S604 which acquires the pair NIF ID 2121 and pair port ID 2122 of a one with the control route 2123 being a route for use in fault events along with VLAN ID 213 and transfer-source MAC address 214 and destination MAC address 215 thereof. Thereafter, proceed to the step S605.

Although not depicted in FIG. 16, the NIF manager 110 into which the control frame was inserted thereinto from the node manager 12 inserts it into the output scheduler 108 in such a way that it is output to a port corresponding to the reception port ID 453 of intra-device header 45.

With this embodiment, it becomes possible, even upon occurrence of operation faults in the first carrier communication network, to establish an appropriate remote control path by active use of another carrier's communication network. This is achievable without having to allocate any special VPN resources for the remote control use. Thus, it is possible to provide users with the intended lease line services with increased reliability at low costs.

Embodiment 2

Figure 17:
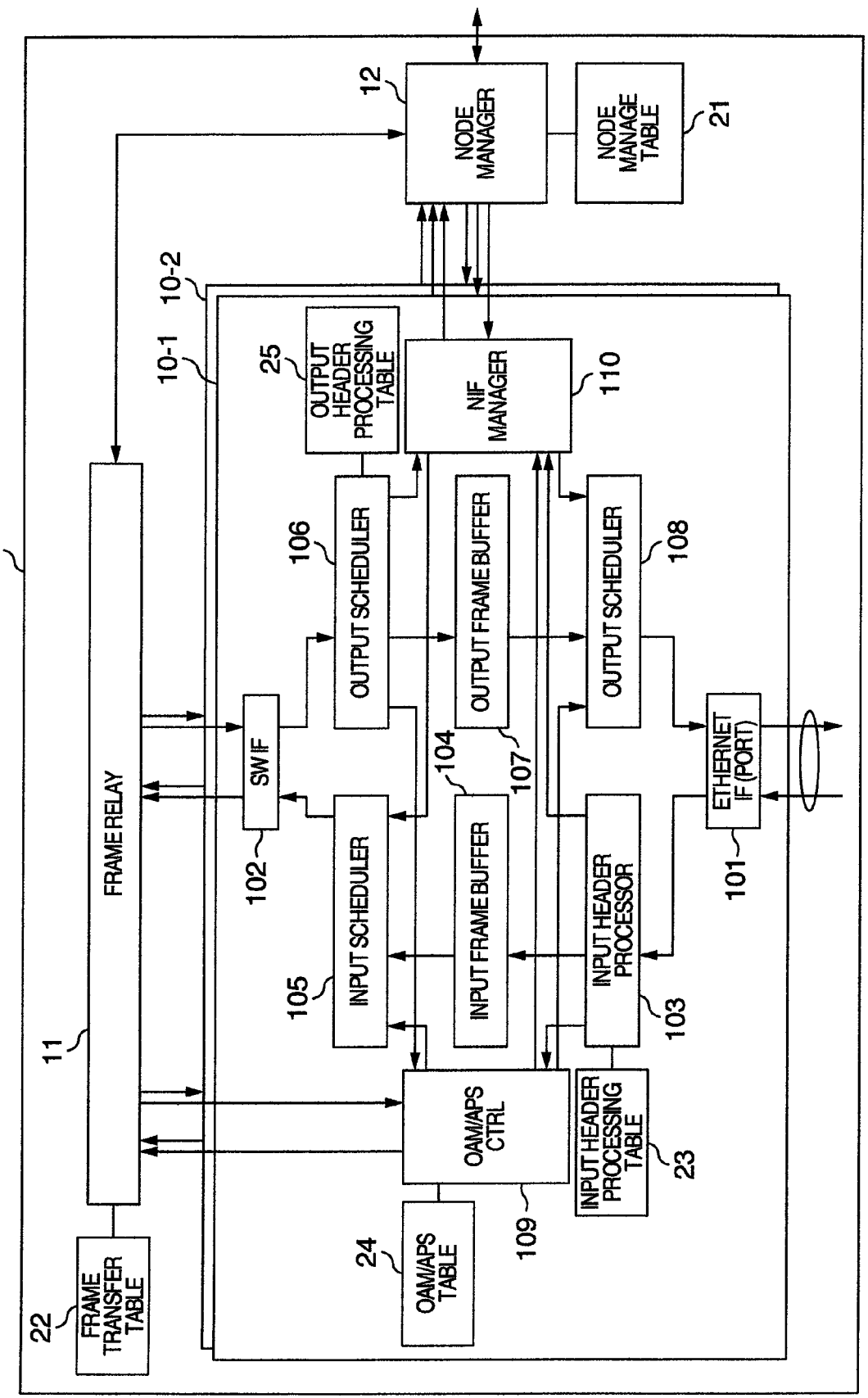
FIG. 17 is a block diagram showing a configuration of a user access device used in a communication system in accordance with another embodiment of this invention.

FIG. 17 shows, in block diagram form, a configuration of a user access device 100N in accordance with another embodiment of this invention.

The user access device 100N as shown herein is similar to the above-stated user access device 10N of the first embodiment, with the network interfaces (NIFs) 10-1 to 10-n of FIG. 5 being replaced by only two NIFs 10-1 and 10-2, each of which has a single I/O interface 101 and a single SW interface 102.

Figure 18:
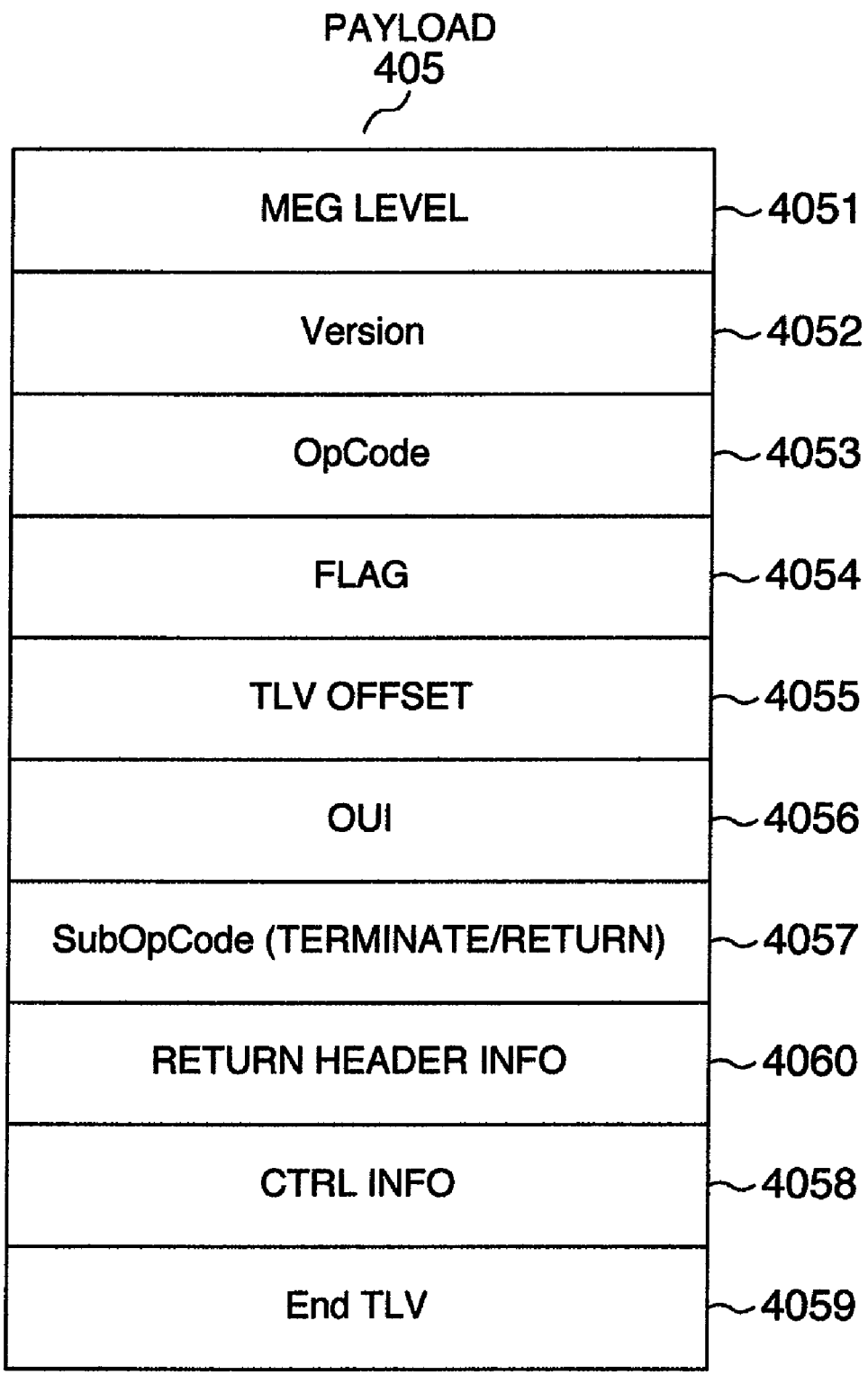
FIG. 18 is a diagram showing a format of payload of a control frame which flows in the communication system also embodying the invention.

FIG. 18 shows another example of the payload 405 which is input to the user access device 100N. Unlike the payload used in the first embodiment, the payload 405 of FIG. 18 is added send-back header information 4060. This send-back header information 4060 contains a destination MAC address, transfer-source MAC address and VLAN header. A send-back pathway of this user access device 100N becomes only one of the NIFs 10-1 and 10-2, which is not the one that received a control frame. Accordingly, as far as send-back header information 1060 for this send-back is available, the intended return processing S800 is realizable without having to use APS information. This makes it possible to perform the return processing S800 irrespective of whether APS execution is present or absent.

Also importantly, as the send-back path of the user access device 100N becomes the remaining NIF only, the control frame is transferable to the NIF manager unit 110 regardless of whether the processing now required is the termination or the send-back. An appropriate example of payload analysis processing S700 employable in this case is as shown in FIG. 19.

Figure 19:
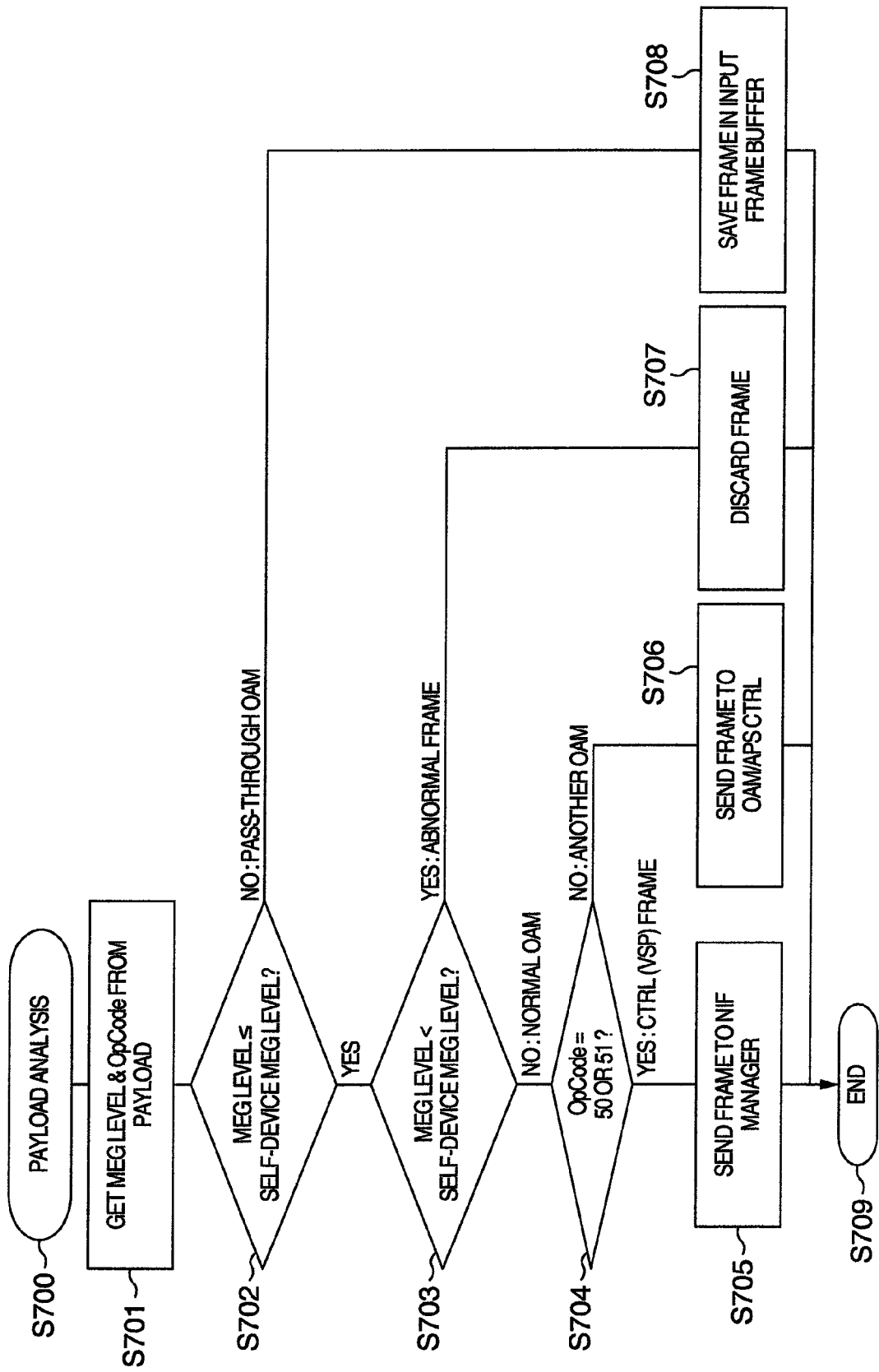
FIG. 19 is a flowchart of payload analysis processing S700 to be performed by an input header processing unit 103 of FIG. 17.

FIG. 19 is a flowchart of the payload analysis processing S700 which is performed by an input header processing unit 103 of the user access device 100N.

A difference between this payload analysis processing S700 and the payload analysis processing S100 of the first embodiment is that the processing after the determination of OpCode to be a control frame as a result of verification is not the control frame transfer processing S200 but a process of transferring the frame to NIF manager 110. Thereafter, the NIF manager 110 sends the control frame to the node manager unit 12, although not shown in FIG. 19.

Figure 20:
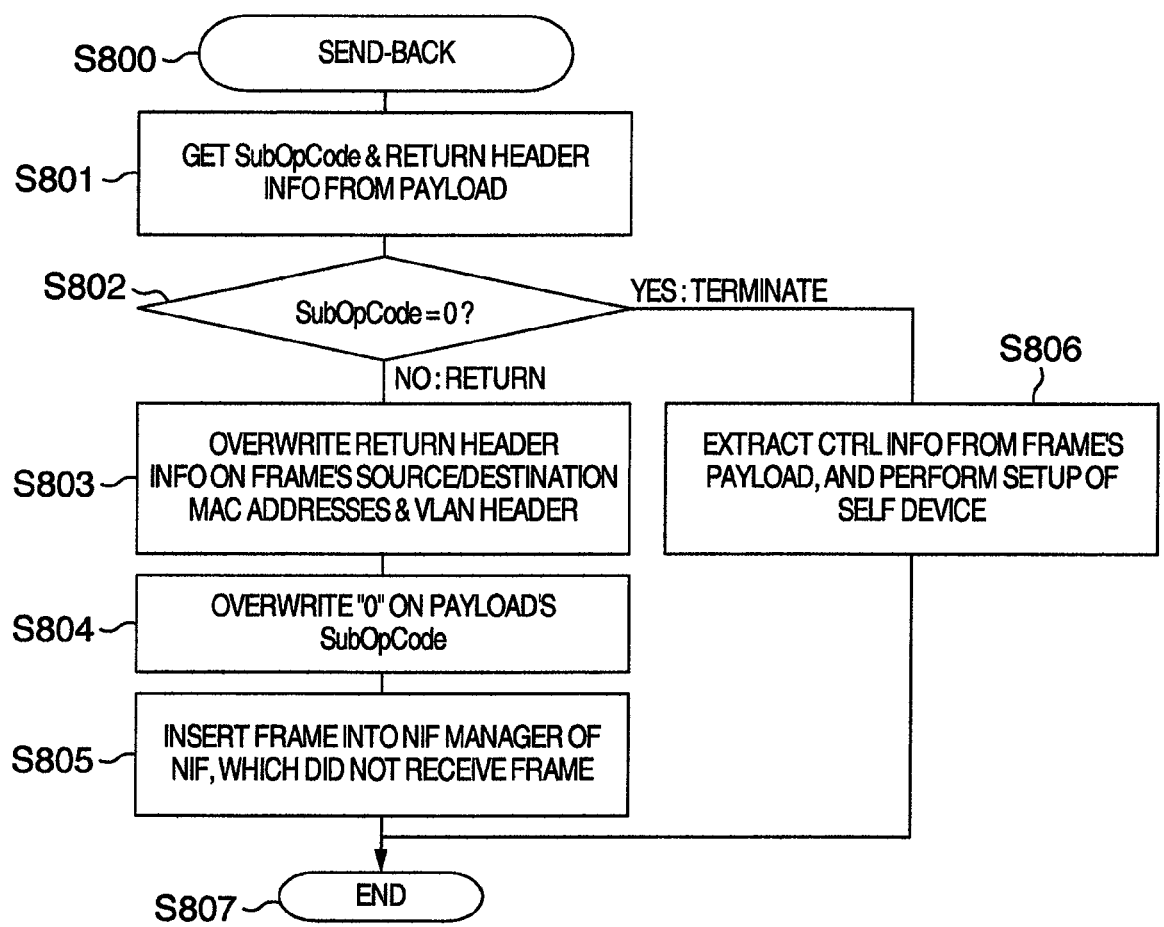
FIG. 20 is a flowchart of send-back processing S800 to be done by a node manager unit 12 of FIG. 17.

FIG. 20 is a flowchart of returning or "echoing" processing S800 to be performed by the node manager 12.

Upon receipt of a control frame from the NIF manager 110, the node manager 12 acquires from the payload 405 the SubOpCode 4057 and send-back header information 4060 (at step S801), and determines whether the SubOpCode 4057 obtained is at "0" (termination) or not (at step S802). If it is judged not to be "0" (termination), i.e., it indicates send-back, the send-back header information 4060 is overwritten onto the control frame's destination MAC address 401 and transfer-source MAC address 402 and also VLAN header 403 (at step S603). Then, the value "0" (termination) is overwritten on the SubOpCode 4057 of payload 405 (at step S804). Next, the frame is inserted into the NIF manager 110 of a NIF which is not the NIF that received the frame (at step S805), followed by quitting the procedure (at step S807). Although not shown in FIG. 20, the NIF manager 110 into which the control frame was inserted from the node manager 12 inserts this control frame into an output scheduler 108 associated therewith. When doing so, it is no longer necessary to take into account the port ID and others. This can be said because there is only one communication line.

At the step S802, if it is judged that the SubOpCode 4057 is at the value "0" (termination), the routine goes to step S806 which extracts control information 4059 from the control frame's payload 405 and then performs settings of self device, followed by exiting this routine.

This embodiment is different from the embodiment 1 in that it is no longer necessary to retain therein the information for sending back to the user access device. Thus, it becomes possible to reduce the user access device's memory capacity and frame processing complexity while at the same time lessening or minimizing setup items of the entire network. This makes it possible to provide the individual user access device at low costs, which leads to an appreciable decrease in costs for management of the network as a whole.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication system comprising:
a user access device;
a plurality of carrier communication networks connected to the user access device;
a plurality of communication devices constituting a respective one of the plurality of carrier communication networks; and
a carrier management network for managing said user access device and said communication devices, wherein
said plurality of carrier communication networks have first and second control routes as set up therein, each of said first and second control routes being formed by said user access device and part of said plurality of communication devices, the first control route including one of said plurality of carrier communication networks, the second control route including a remaining one of said plurality of carrier communication networks which is not included in said first control route,
said carrier management network operates to send out a control frame insertion command toward a communication device of said communication devices,
the communication device is responsive to receipt of the control frame insertion command, for using any one of said first and second control routes to transmit a control frame,
the user access device that receives the control frame uses information within the received control frame to perform its own device setup and control,
said communication device uses the first control route to transmit the control information in cases where said first control route is free from any operation fault and, in a case where an operation fault occurs in said first control route, uses the second control route to transmit said control information;
said user access device is linked to another user access device at an opposite end;
said communication device sends, in accordance with the control frame insertion command from the carrier management network, a control frame toward said another user access device, said control frame having control frame transfer information added that indicates that processing to be done at said another user access device is one of termination and send-back;
upon receipt of the control frame, said another user access device terminates the control frame at itself when said control frame transfer information indicates the termination and, when said control frame transfer information indicates the send-back, adds thereto a header necessary for the send-back and then transmits it to said user access device;
when searching for the header necessary for the send-back, said another user access device specifies said header necessary for the send-back based on information for control of operational administration and maintenance (OAM) and/or automatic protection switching (APS) in a case of the OAM and/or APS being performed between itself and said user access device,
the user access device converts the information indicating send back in the control frame to the information indicating termination,
said another user access device converts the information indicating termination in the control frame to the information indicating send-back and transmits a response control frame toward the user access device when said another user access device receives the control frame via the second communication route,
the user access device converts the information indicating send-back in the response control frame to the information indicating termination and transmits the response control frame toward the second communication device when the user access device receives the response control frame through the second communication route, and
the second communication device transmits a control information based on the response control frame toward the first carrier management network when the second communication device receives the response control frame.

2. The communication system according to claim 1, wherein when searching for the header necessary for the send-back, said another user access device specifies said header necessary for the send-back based on header information being added to the control frame received.

3. A network system having a first communication route where a first user access device and a second user access device are connected via a first network and a second communication route where the first user access device and the second user access device are connected via a second network wherein:
when the first user access device receives a control frame from the first network or from the second network and the control frame indicates that the frame is to be sent-back, the first user access device converts a header of the control frame to a header retrieved based on information for control of operational administration and maintenance (OAM) and/or automatic protection switching (APS) set with the second user access device and transmits the control frame through one of the first communication route and the second communication route which is different from a communication route through which the control frame was received,
the first network is connected to a first carrier management network,
the first carrier management network operates to send out a control frame embedding an information indicating the control frame is sent-back at the first user access device toward a second communication device in the first network connected to the first user access device when an operation fault occurs at a first communication device in the first network connected to the second user access device,
the first user access device converts the information indicating send back in the control frame to the information indicating termination,
the second user access device converts the information indicating termination in the control frame to the information indicating send-back and transmits a response control frame toward the first user access device when the second user access device receives the control frame via the second communication route, the first user access device converts the information indicating send-back in the response control frame to the information indicating termination and transmits the response control frame toward the second communication device when the first user access device receives the response control frame through the second communication route, and the second communication device transmits control information based on the response control frame toward the first carrier management network when the second communication device receives the response control frame.

4. A network system according to claim 3, wherein the first user access devices store OAM and/or APS table, retrieves the header based on the table and convert a header using a pair port different from a receiver port.

* * * * *